(12) United States Patent
Shalaby et al.

(10) Patent No.: US 12,483,038 B1
(45) Date of Patent: Nov. 25, 2025

(54) SYSTEM AND METHOD FOR TARGET DETECTION AND ENERGY DELIVERY

(71) Applicant: IMAM MOHAMMAD IBN SAUD ISLAMIC UNIVERSITY, Riyadh (SA)

(72) Inventors: Mohamed Yehia Mohamed Shalaby, Riyadh (SA); Abdullah N. Alhatlani, Riyadh (SA); Abdulrahman M. Shalaby, Kajang (MY)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/265,591

(22) Filed: Jul. 10, 2025

(51) Int. Cl.
*H02J 3/38* (2006.01)
*H02J 3/46* (2006.01)
*H02S 50/10* (2014.01)

(52) U.S. Cl.
CPC ............... *H02J 3/381* (2013.01); *H02J 3/46* (2013.01); *H02S 50/10* (2014.12); *H02J 2300/26* (2020.01)

(58) Field of Classification Search
CPC ...... H02J 3/38; H02J 3/381; H02J 3/46; H02J 2300/26; H02S 50/10
See application file for complete search history.

(56) References Cited

U.S. PATENT DOCUMENTS

| | | |
|---|---|---|
| 2013/0175862 A1 | 7/2013 | Kelly |
| 2015/0354833 A1 | 12/2015 | Kreutzman |

FOREIGN PATENT DOCUMENTS

| | | |
|---|---|---|
| CN | 116937659 A | 10/2023 |
| KR | 10-2626309 B1 | 1/2024 |
| TW | I524165 B | 3/2016 |

OTHER PUBLICATIONS

Okan Güngör, et al., "Novel PV Array Reconfiguration and Integration with a Maximum Power Point Tracking Algorithm: RMPPT", Arabian Journal for Science and Engineering, vol. 48, Jul. 26, 2023, pp. 15445-15461.

*Primary Examiner* — Robert L Deberadinis
(74) *Attorney, Agent, or Firm* — Oblon, McClelland, Maier & Neustadt, L.L.P.

(57) ABSTRACT

A photovoltaic (PV) power system and a method for controlling the PV power system are provided. The system includes two or more PV panels. The system includes a maximum power point tracking (MPPT) circuit configured to adjust power extraction from each PV panel. The system includes a microcontroller configured to execute a real-time control algorithm to manage dynamic operation of the photovoltaic power system. The system includes a dual-input DC-DC converter that is configured to receive and process an independent power input from each PV panel. The dual-input DC-DC converter is configured to maintain energy transfer to balance one or more variations in power between the PV panels due to one or more mismatched irradiance conditions. The dual-input DC-DC converter is configured to regulate a duty cycle based on a control signal from the microcontroller. The dual-input DC-DC converter is configured to produce an output voltage for one or more DC loads.

16 Claims, 21 Drawing Sheets

SYSTEM AND METHOD FOR TARGET DETECTION AND ENERGY DELIVERY

BACKGROUND

Technical Field

The present disclosure is directed to renewable energy systems, and more particularly to a photovoltaic (PV) power system and a method to control the PV power system.

Description of Related Art

The background description provided herein is for the purpose of generally presenting the context of the disclosure. Work of the presently named inventors, to the extent that it is described in this background section, as well as aspects of the description which may not otherwise qualify as prior art at the time of filing, are neither expressly nor impliedly admitted as prior art against the present invention.

Photovoltaic (PV) energy systems are increasingly utilized in the generation of renewable electricity for residential, industrial, and commercial applications. With the expansion of decentralized and off-grid energy needs, particularly in remote, underserved, or resource-constrained regions, solar PV systems have emerged as a preferred technology due to their scalability, low environmental impact, and relative ease of deployment. However, conventional PV systems have limitations that reduce their operational efficiency, adaptability, and economic feasibility in real-world conditions, especially outside of controlled urban environments.

Existing systems or PV installations typically employ fixed electrical configurations in which PV panels are arranged in either series or parallel topologies. Power output from these fixed electrical configurations is typically regulated by inverters or Maximum Power Point Tracking (MPPT) circuitry. While the existing systems may improve performance in stable irradiance environments, they fail to adapt dynamically to fluctuating environmental conditions. Consequently, the existing systems are unable to maintain consistent energy output during variations (e.g., fluctuations) in solar irradiance caused by cloud cover, time-of-day changes, partial shading, or seasonal differences.

Another significant limitation of the existing PV systems is the inefficiency under fluctuating solar irradiance. Solar panel output can vary substantially based on sunlight intensity, and static configurations are incapable of dynamically reallocating electrical topology to mitigate power losses. As a result, energy generation is often suboptimal, particularly in off-grid or mobile applications where sunlight availability is neither uniform nor predictable.

Further, conventional photovoltaic (PV) systems exhibit limited flexibility in adapting to varying load requirements. Such systems are typically designed to support either alternating current (AC) or direct current (DC) loads independently and are not configured to efficiently supply power to both load types concurrently. In residential applications where mixed AC and DC loads coexist, this limitation restricts the efficient utilization of generated energy. Additionally, conventional PV architectures are primarily optimized for peak power generation rather than real-time load-matched energy delivery, resulting in suboptimal energy utilization and unbalanced load distribution.

Another challenge associated with the existing PV systems is the high dependence on expensive and complex power electronics, such as advanced inverters or dynamic MPPT controllers. These components significantly increase the cost and maintenance burden of PV installations. In remote areas where technical support and spare parts are limited or unavailable, the use of such components renders the systems impractical or economically unsustainable.

Partial shading conditions further intensify the PV system's inefficiency. In conventional arrays, the performance of the entire string of PV panels can degrade due to shading on a single PV panel, as the existing PV system lacks mechanisms for bypassing or adapting to such non-uniform conditions. This results in disproportionate losses of output energy, even when only a portion of the array is affected.

Additionally, existing PV systems inadequately address energy storage for nighttime use. Although batteries can be integrated into the existing PV systems, ensuring stable and efficient charging from variable solar inputs without advanced (and costly) power management circuits remains a significant challenge. In contexts where advanced battery management systems are infeasible, existing PV systems often fail to store energy effectively for later use.

TWI524165B discloses a photovoltaic module array configuration system that utilizes a particle swarm optimization (PSO) algorithm to optimize the interconnection structure of a solar photovoltaic module array. The system can modify the configuration in response to shading or fault conditions to improve energy output. However, the disclosed system is limited in scalability and flexibility, and relies on relatively complex hardware arrangements. Additionally, it does not address cost-efficiency, simplicity in control logic, or adaptability to scenarios involving varying panel conditions.

KR102626309B1 discloses a photovoltaic system that selects a series or parallel connection configuration based on real-time analysis of irradiance, load characteristics, and converter topology to enhance MPPT. While the disclosed system provides adaptive reconfiguration, it remains constrained by its dependence on specific converter topology selection and lacks generalized applicability in environments with fluctuating irradiance across distributed panels. Furthermore, the disclosed system relies on traditional perturb-and-observe techniques, which may limit its responsiveness and optimization precision under dynamic environmental conditions.

Therefore, there is a need for a system and a method that can overcome the limitations in the existing systems.

SUMMARY

In an exemplary embodiment, a photovoltaic power system is described. The photovoltaic power system includes two or more photovoltaic (PV) panels. The system further includes a maximum power point tracking (MPPT) circuit configured to adjust power extraction from each PV panel. The system further includes a microcontroller configured to execute a real-time control algorithm to manage dynamic operation of the photovoltaic power system. The system further includes a dual-input direct current to direct current (DC-DC) converter that is configured to receive and process an independent power input from each PV panel. The dual-input DC-DC converter is also configured to maintain energy transfer to balance one or more variations in power between the PV panels due to one or more mismatched irradiance conditions among the PV panels, and to regulate a duty cycle based on a control signal from the microcontroller. The dual-input DC-DC converter is further configured to produce an output voltage for one or more DC loads.

In some embodiments, the microcontroller is configured to measure and analyze a voltage, a current, and a power output from each PV panel. The microcontroller is also configured to detect one or more variations in irradiance and mismatch effects between the PV panels. The microcontroller is further configured to execute a Particle Swarm Optimization (PSO) algorithm to determine an MPPT setting and a DC-DC converter setting. The microcontroller is further configured to adjust the MPPT circuit and the DC-DC converter operation in response to a real-time condition. The microcontroller is further configured to maintain power output during one or more conditions including shading, panel mismatch, or environmental variation.

In some embodiments, the MPPT circuit is configured to track the maximum power of each PV panel, receive a control parameter from the microcontroller to adjust an operating condition of each PV panel, and modify the voltage and current for each panel to increase energy extraction.

In some embodiments, the photovoltaic power system comprises of the microcontroller. The microcontroller is further configured to measure and analyze irradiance levels and electrical characteristics of each PV panel. The microcontroller is configured to detect and compensate for one or more differences in irradiance and power mismatch between the PV panels. The microcontroller is further configured to execute a Particle Swarm Optimization (PSO) algorithm to determine an operating parameter for each PV panel. The microcontroller further configured to adjust an MPPT setting and a parameter of the dual-input DC-DC converter to increase power transfer. In addition, the microcontroller maintains a power output during one or more shading conditions and one or more environmental variations.

In some embodiments, a switching matrix includes three electronic switches for each PV panel. The switching matrix is configured to reconfigure connections between the PV panels between series and parallel configurations, and the switching matrix is configured to adjust the connections based on real-time irradiance data to meet a voltage requirement and a power requirement of an electrical load connected to an output of the dual-input DC-DC converter.

In some embodiments, the system comprises a switching matrix configured to bypass a PV panel to prevent a power loss in the system.

In some embodiments, the system comprises a photodetector array that is configured to measure real-time irradiance for each PV panel and provide the irradiance measurement to the microcontroller.

In some embodiments, the system comprises a battery storage system that includes the dual-input DC-DC converter is configured to deliver the output voltage to charge the battery storage system. The system also includes the microcontroller that reconfigures connections of the PV panels to maintain power delivery to the battery storage system during one or more variations (e.g., fluctuations) in irradiance.

In some embodiments, the dual-input DC-DC converter is configured to deliver the output voltage to a DC home appliance and the microcontroller is configured to control switching of connections of the PV panels to maintain the output voltage against one or more variations in irradiance.

In some embodiments, the dual-input DC-DC converter includes a fixed-duty-cycle configuration that adapts the reconfigured connections of the PV panels to power a DC appliance using the output voltage and a current.

In some embodiments, the dual-input DC-DC converter further comprises a transformer coupled to the PV panels through a plurality of switches. Each PV panel is connected to the transformer through a switch, and the microcontroller is configured to adjust a duty cycle for the switch to compensate for power variation at the corresponding PV panel due to an irradiance condition. In some examples, the microcontroller dynamically adjusts the duty cycle of each switch to balance power imbalances among the PV panels, caused by non-uniform sun exposure. This adjustment enables the system to accommodate irradiance variations across the array, ensuring stable and efficient power delivery.

In some embodiments, the system includes the dual-input DC-DC converter which is configured to operate with a fixed configuration. They system also includes the microcontroller which is configured to dynamically reconfigure the connections of the PV panels to adapt to one or more changes in irradiance conditions.

In some embodiments, the microcontroller is further configured to adjust a phase shift between a switching cycle of a switch connected to a PV panel and a switching cycle of another switch connected to another PV panel to improve power extraction from the PV panels.

In some embodiments, the Particle Swarm Optimization (PSO) algorithm is configured to explore a plurality of duty cycle combinations for each PV panel, to evaluate a fitness function based on power extraction, and to determine a duty cycle value that balances one or more power variations between the PV panels.

In some embodiments, the microcontroller executes an algorithm that analyzes a power requirement of a plurality of DC appliances connected to the system, determine a switch configuration based on the analyzed power and distributes power to the plurality of DC appliances.

In another exemplary embodiment, a method for reconfiguring connections between photovoltaic panels is disclosed. The method includes measuring a real-time irradiance level at each PV panel using a photodetector array. The method further includes analyzing the irradiance level to determine a panel connection configuration. The method further includes activating or deactivating a plurality of switches to connect the PV panels in a series arrangement or a parallel arrangement. The method further includes adapting connections of the PV panels to maintain a voltage to an electrical load when one or more environmental conditions change.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
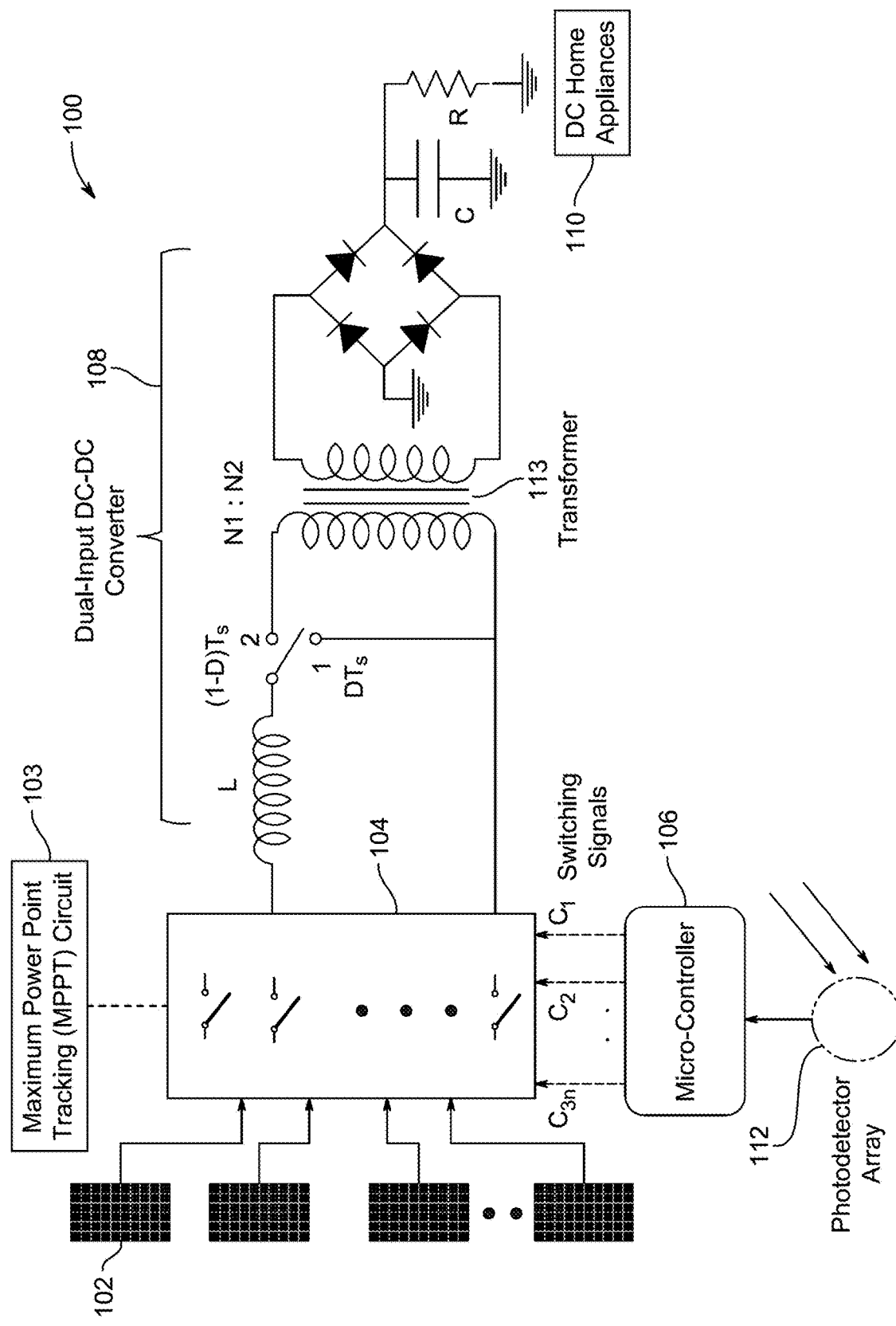
FIG. 1A illustrates an exemplary representation of an architecture for a photovoltaic (PV) power system, according to an embodiment of the present invention.

In the drawings, reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

In various aspects of the disclosure, non-limiting definitions of one or more terms that will be used in the document are provided below.

The term "maximum power point tracking (MPPT)" used hereinafter in the specification refers to a control technique for adjusting an electrical operating point of photovoltaic panels to ensure maximum power output under varying environmental conditions.

The term "particle swarm optimization (PSO)" used hereinafter in the specification refers to a heuristic optimization algorithm inspired by social behaviour of bird flocking, employed to determine optimal control parameters such as duty cycles and phase shifts in a photovoltaic power system.

The term "duty cycle" used hereinafter in the specification refers to a ratio of the ON time of a switch to a total switching period in a power electronic circuit.

The term "photodetector array" used hereinafter in the specification refers to a group of light-sensitive components that measure solar irradiance incident on photovoltaic panels.

The term "irradiance" used hereinafter in the specification refers to an amount of solar power per unit area received from sun in the form of electromagnetic radiation.

The term "switching matrix" used hereinafter in the specification refers to an array of electronic switches that dynamically reconfigure the connections of PV panels to achieve optimal power delivery.

Existing photovoltaic (PV) energy systems, particularly those deployed in remote or off-grid environments, suffer from several critical limitations that hinder the performance, reliability, and adaptability of these systems. The existing PV energy systems typically rely on static electrical configurations, either fixed series or parallel connections, and depend on complex, centralized inverters or maximum power point tracking (MPPT) hardware to manage power output. As a result, the existing PV energy systems are unable to respond effectively to variable solar irradiance caused by weather conditions, shading, or diurnal cycles. The existing PV energy systems also lack the flexibility to dynamically adapt the output to meet changing load requirements, especially when servicing mixed AC and DC household appliances. Furthermore, many existing PV energy systems are heavily dependent on high-cost, high-maintenance components that are often impractical for deployment in economically constrained or infrastructure-limited regions. Inefficiencies due to mismatched panel outputs, limited partial shading compensation, and poor battery charging strategies further reduce the viability of the existing PV energy systems for real-world applications.

The present disclosure overcomes the limitations of the existing PV energy systems by introducing a photovoltaic (PV) power system that dynamically reconfigures the electrical connections between PV panels in real-time, based on environmental and load conditions. The PV power system incorporates a microcontroller-controlled switching matrix and per-panel irradiance sensing to modify the series-parallel configuration of the PV panels, ensuring optimal energy extraction under varying sunlight conditions.

The present disclosure provides the PV power system and a method that integrates a dual-input DC-DC converter, an MPPT circuit, and a real-time optimization algorithm, such as Particle Swarm Optimization (PSO), to balance power variation between panels and to deliver a stable output voltage. The present disclosure supports efficient power delivery to both DC appliances and battery storage units, compensating for shading, mismatches, and fluctuating loads. Additionally, the present disclosure is designed with cost-effective, readily available components, making the present disclosure well-suited for deployment in remote, off-grid, or low-resource environments. By combining adaptive topology control, intelligent optimization, and scalable power management, the present disclosure offers a reliable, flexible, and efficient energy solution for diverse residential and rural energy applications.

FIG. 1A illustrates an exemplary representation of an architecture for a photovoltaic (PV) power system 100, according to an embodiment of the present invention.

The photovoltaic power system 100 comprises two or more PV panels 102, a maximum power point tracking (MPPT) circuit 103, a switching matrix 104, a microcontroller 106, a dual-input direct current (DC-DC) converter 108, and a photodetector array 112. The dual-input direct current (DC-DC) converter 108 is further connected to a plurality of direct current (DC) appliances/a plurality of DC home appliances 110.

In an embodiment, the two or more PV panels (102) may be interchangeably referred to as the PV panel (102) or the PV panels (102) or each PV panel (102), according to one or more aspects of the present disclosure.

In an embodiment, each of the two or more PV panels 102 is configured to capture solar energy and convert the solar energy into electrical power. Each PV panel 102 is structurally formed from conventional photovoltaic materials such as monocrystalline silicon or polycrystalline silicon and may be physically mounted in a modular, spaced array to ensure optimal sunlight exposure. The PV panels 102 are connected to downstream components via electrical conductors capable of transmitting the generated electrical power.

In an embodiment, the MPPT circuit 103 is connected to each PV panel 102 and configured to monitor and regulate the electrical power output of the panel. The MPPT circuit 103 adjusts electrical parameters of the PV panel 102, such as voltage and current, to operate each PV panel 102 at or near its MPPT, which varies dynamically based on solar irradiance, ambient temperature, and load conditions. The MPPT circuit 103 may comprise analog-to-digital converters, voltage and current sensors, and control logic that adjusts the electrical operating conditions of the photovoltaic (PV) panels 102 to optimize energy extraction In an embodiment, the MPPT circuit 103 operates independently for each PV panel 102 and continuously samples the voltage and current to calculate instantaneous power. Based on these measurements, the MPPT circuit 103 determines the voltage-current operating point that corresponds to the maximum power point under existing environmental conditions. This ensures that each PV panel 102 maintains optimal efficiency regardless of mismatch effects.

In an embodiment, the MPPT circuit 103 receives a control parameter(s) from the microcontroller 106. The control parameter(s) may include voltage values, slope estimates, or modulation timings that direct the adjustment of electrical operating point of the PV panel 102. In an embodiment, the MPPT circuit 103 modifies the voltage and current of each PV panel 102 to increase energy extraction through adjustment of its input impedance or converter settings to ensure operation at the maximum power point.

In an embodiment, the MPPT circuit 103 interfaces with the switching matrix 104. The switching matrix 104 comprises three switches per PV panel 102 and is configured to dynamically reconfigure interconnections among the PV panels 102 in series, parallel, or hybrid configurations. The switches are implemented using high-speed semiconductor devices. The switching matrix 104 operates under control signals generated by the microcontroller 106, which determine the appropriate PV panel 102 interconnection scheme.

In an embodiment, the switching matrix 104 reconfigures PV panel 102 connections based on real-time irradiance data to meet the voltage and power requirements of a connected load, such as direct current (DC) home appliances 110. The microcontroller 106 receives irradiance measurements from the photodetector array 112 and the microcontroller 106 uses the real-time irradiance data to determine and implement the most energy-efficient PV panel 102 configuration.

In an embodiment, the switching matrix 104 is further configured to bypass underperforming PV panels 102 if the power output of the PV panels 102 drops below a defined threshold due to shading, degradation, or failure. This prevents loss of current flow in the series connection and preserves energy efficiency in the overall system 100.

In an embodiment, the microcontroller 106 is configured to execute real-time control functions for the photovoltaic power system 100. The microcontroller 106 receives inputs from the photodetector array 112 and various sensors measuring voltage and current. The microcontroller 106 processes the real-time data from voltage and current sensors, to detect mismatch conditions and optimize system performance through appropriate control of the MPPT circuit 103, switching matrix 104, and dual-input DC-DC converter 108, to determine irradiance levels and energy production.

In an embodiment, the microcontroller 106 introduces a phase shift between the switching cycles of switches connected to different PV panels 102. The phase shift reduces ripple current, avoids simultaneous peak currents, and ensures efficient energy transfer from each PV panel 102.

In an embodiment, the microcontroller 106 evaluates the power requirements of each DC home appliance 110 connected to the photovoltaic power system 100. Each DC home appliance 110 may have unique operational characteristics such as voltage, current, and priority levels. The microcontroller 106 selects a suitable configuration of PV panel 102 connections and switching logic based on these load demands.

In an embodiment, the microcontroller 106 determines and implements a switching configuration based on the load analysis. This may include selecting which PV panels 102 should be connected in series or parallel and controlling the switches accordingly. The objective is to align PV panel 102 output with demand conditions.

In an embodiment, the microcontroller 106 executes a control algorithm that distributes available solar power across the connected DC home appliances 110, prioritizing essential loads and maintaining power stability during varying environmental conditions. In some examples, the microcontroller 106 maintains a load-priority table stored in non-volatile memory. Each DC appliance is assigned a priority flag (e.g., "critical," "preferred," or "non-essential"). In some implementations, the available PV power falls below a threshold, and the microcontroller 106 sequentially reduces or disconnects non-essential loads by opening their dedicated MOSFET switches, thereby preserving power to critical appliances such as medical refrigerators or lighting. In such examples, the priority table may be reprogrammed via a UART or I²C service port.

In an embodiment, the microcontroller 106 is configured to implement an optimization algorithm, such as Particle Swarm Optimization (PSO), to assist in determining MPPT operating points and switching configurations. The microcontroller 106 uses the PSO algorithm to explore a plurality of candidate duty cycle combinations for each PV panel 102. Each combination represents a distinct switching configuration that affects energy extraction. The PSO algorithm evaluates a fitness function based on instantaneous power output, voltage, current, mismatch levels, and overall system efficiency. Using feedback from this evaluation, the algorithm converges toward an optimal set of parameters that adapts dynamically to variations in solar irradiance and load demand.

In some examples, the PSO algorithm may fail to converge within a predefined iteration budget (e.g., 100 cycles). In such examples, the controller reverts to a perturb-and-observe MPPT routine to guarantee continuous operation. This fail-safe routine prevents prolonged efficiency loss due to algorithmic stalls or sensor anomalies.

In an embodiment, once the optimal duty cycle values are determined, the microcontroller 106 applies these values to the dual-input direct current (DC-DC) converter 108 or the switches connected to the PV panels 102. This configuration not only maximizes energy extraction from each PV panel 102 but also balances power output across PV panels 102 exposed to different irradiance conditions.

In an embodiment, the dual-input DC-DC converter 108 is configured to receive an independent power input from each PV panel 102. Each line of the independent power input is routed through the switch controlled by the microcontroller 106, enabling independent regulation of the electrical connection from each PV panel 102 to the dual-input DC-DC converter 108. The dual-input DC-DC converter 108 includes two or more inductors, high-speed switching transistors (such as MOSFETs), a transformer (in isolated configurations), and one or more output filtering components. The dual-input DC-DC converter 108 regulates a duty cycle of each switching transistor based on control signals received from the microcontroller 106, thereby controlling the conversion ratio and adapting to power variations across input sources.

In an embodiment, the dual-input DC-DC converter 108 functions to balance the power variation between the PV panels 102 due to a mismatched irradiance condition. In an example, when a PV panel (A) receives less sunlight than a PV panel (B), the dual-input DC-DC converter 108 adjusts a duty cycle for the PV panel (A) input path to ensure that total power delivery remains stable. The duty cycle refers to the proportion of time the switch remains in the ON state during each switching cycle, which directly affects the voltage conversion ratio of the dual-input DC-DC converter 108. The active balancing ensures that the weaker panel (in this case, PV panel (A)) does not become a bottleneck in power conversion and maximizes the overall efficiency of the photovoltaic power system 100. The dual-input DC-DC converter 108 outputs a regulated voltage, suitable for charging a battery system or powering DC loads.

In an embodiment, the dual-input DC-DC converter 108 regulates each input path using control signals generated by the microcontroller 106. The control signals are based on real-time monitoring of environmental and electrical data, enabling the dual-input DC-DC converter 108 to efficiently process energy from each PV panel 102.

In an embodiment, the dual-input DC-DC converter 108 maintains energy transfer to balance power variation due to an irradiance difference among the PV panels 102. When irradiance received by each PV panel 102 is lower than that of another PV panel, which may be caused by partial shading, soiling, or orientation mismatch, the microcontroller 106 detects the resulting power imbalance. The microcontroller 106, in response, modifies the control signal to the dual-input DC-DC converter 108 such that energy is drawn proportionally from the more productive PV panels while minimizing the impact of the underperforming PV panels.

In an embodiment, the dual-input DC-DC converter 108 is configured to produce an output voltage suitable for driving downstream loads or charging energy storage systems. The output voltage is regulated through coordinated adjustments of the duty cycles for the input switches and the internal power processing circuitry, including inductors and filtering capacitors. The output voltage remains stable despite variations in the input voltages from the two or more PV panels 102, owing to the real-time feedback and control implemented by the microcontroller 106. The regulated output can be tailored to meet standard DC appliance voltage levels or battery charging requirements, thereby enhancing the utility and compatibility of the photovoltaic power system 100.

In an embodiment, the photovoltaic power system 100 includes a battery storage system for storing excess energy produced during peak sunlight hours. The dual-input DC-DC converter 108 is configured to deliver the output voltage to charge the battery storage system. The microcontroller 106 adjusts the PV panel 102 configurations in real time to ensure that a consistent charging voltage is maintained even during fluctuating irradiance conditions.

In an embodiment, the microcontroller 106 is further configured to reconfigure connections of the PV panels 102 to maintain power delivery to the battery storage system during a fluctuation in the irradiance. The microcontroller 106 dynamically monitors the power requirements of the connected load and reconfigures the panel interconnections to maintain voltage stability in response to variations in environmental conditions. The dual-input DC-DC converter

108 is further configured to supply the regulated voltage directly to the DC home appliance 110.

In some implementations, the battery storage system may implement a battery-charging routine that employs a constant-current/constant-voltage (CC/CV) profile. During the constant-current stage, the microcontroller 106 holds the converter in current-mode control until the battery voltage reaches a predefined float threshold. It then transitions to constant-voltage mode, tapering the charge current to prevent overcharge.

In some examples, if the PV panels 102 fail to provide sufficient power, the battery-charging routine automatically reverts the converter to load-supply mode to maintain power delivery to the DC appliances 110. In an embodiment, the dual-input DC-DC converter 108 delivers regulated voltage to DC home appliances 110, and the microcontroller 106 controls the switching matrix 104 to stabilize voltage during irradiance variation.

In an embodiment, the dual-input DC-DC converter 108 is implemented with a fixed-duty-cycle configuration having a constant switching frequency. In such cases, the PV panel 102 interconnections are modified to maintain the required output voltage and current.

In an embodiment, the dual-input DC-DC converter 108 includes a transformer 113 that is coupled to each PV panel 102 through a plurality of switches. In particular, each PV panel 102 is connected to the transformer 113 through the switch. The microcontroller 106 adjusts the duty cycle for each switch to accommodate the irradiance conditions.

In one implementation, the plurality of switches forms a full-bridge around the transformer primary, enabling either phase-shift or duty-cycle modulation to control the effective turns ratio dynamically. The transformer 113 provides galvanic isolation between the PV string and the downstream DC bus, enhancing user safety and allowing flexible ground referencing.

Figure 1B:
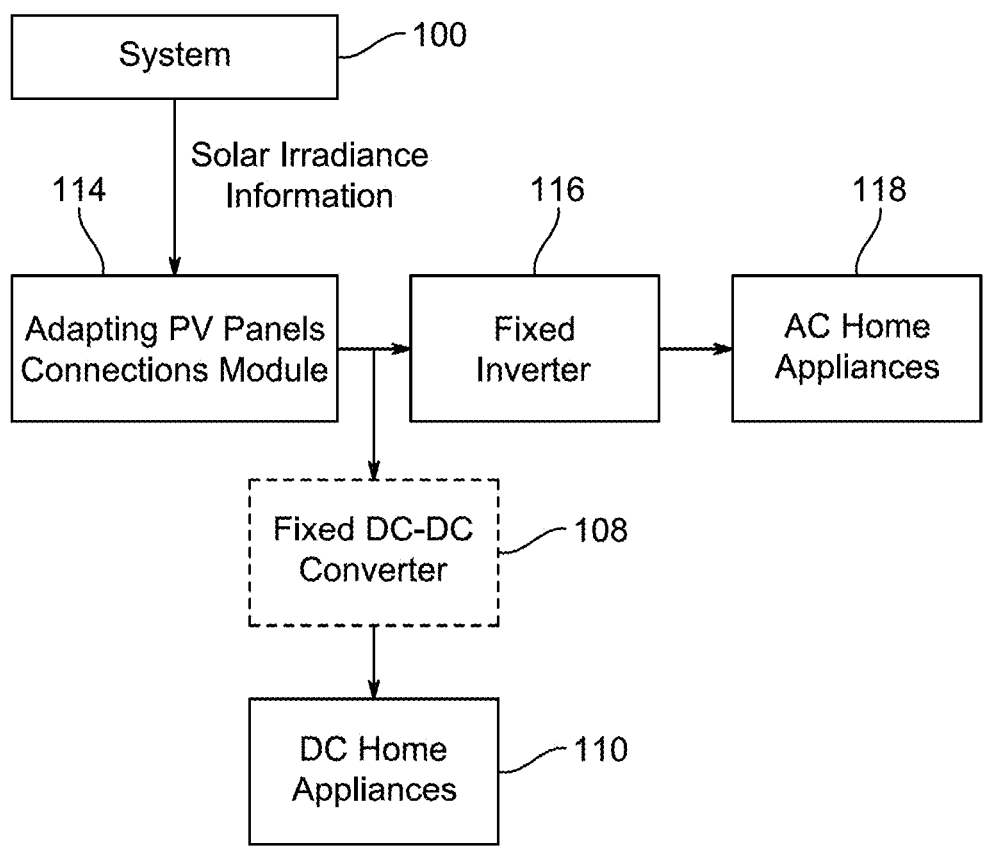
FIG. 1B illustrates an exemplary block diagram of the PV power system, according to an embodiment of the present invention.

FIG. 1B illustrates an exemplary block diagram of the photovoltaic (PV) power system 100, according to an embodiment of the present invention.

In an embodiment, the PV power system 100 is configured to deliver power to both direct current (DC) and alternating current (AC) home appliances (e.g., the home appliances 110). The PV power system 100 delivers solar irradiance information to adapting PV panel connections module that respond to environmental changes, particularly solar irradiance levels, to maintain efficient and consistent energy output.

In an embodiment, the adapting PV panel connections module 114 receives solar irradiance information. The adapting PV panel connections module 114 also receives voltage and current sensor data, as well as load demand parameters from the microcontroller 106. Based on this data, the adapting PV panel connections module 114 executes a real-time optimization algorithm that selects the optimal series-parallel configuration of the PV panels to maximize energy extraction and satisfy load requirements. In such examples, one or more high-speed semiconductor switches within the adapting PV panel connections module 114 enable rapid and reliable reconfiguration of the PV panel 102 array. The adapting PV panel connections module 114 is configured to dynamically reconfigure the electrical arrangement of the PV panels, such as switching between series and parallel configurations, based on the irradiance conditions. The reconfiguration allows the PV panel 102 array to operate near its maximum power point tracking (MPPT), enhancing power generation efficiency in real time.

In an embodiment, the electrical output from the adapting PV panel connections module 114 is distributed through two parallel energy pathways. A first energy pathway delivers power to a fixed DC-DC converter 108, also referred to as dual-input DC-DC converter 108. The fixed DC-DC converter 108 stabilizes voltage and current outputs from the PV panel 102 array, employing feedback control loops interfaced with the microcontroller 106 to implement MPPT algorithms and battery charging protocols. In such examples, the DC-DC converter 108 incorporates protection circuits to prevent overcurrent and overheating, ensuring reliable operation under varying environmental and load conditions. The fixed DC-DC converter 108 is configured to stabilize the voltage and current output from the PV panels, ensuring safe and reliable power delivery to DC home appliances 110. The PV power system 100 maintains the fixed-design DC-DC converter 108 while altering a connection of the PV panels to adapt to the irradiance condition. The DC home appliances 110 appliances may include lighting systems, fans, or other low-voltage electronics that operate directly on the DC power. The fixed-design DC-DC converter 108 maintains a regulated output despite fluctuations in panel input due to environmental variability.

In an embodiment, a second energy pathway from the adapting PV panel connections module 114 is connected to a fixed inverter 116. The fixed inverter 116 converts DC power into AC power with a predetermined output voltage and frequency, suitable for residential AC appliances 118. In some examples, the fixed inverter 116 employs pulse-width modulation (PWM) techniques to maintain waveform quality with low total harmonic distortion (THD). The inverter communicates status and fault information to the microcontroller 106, allowing coordinated system control and protective shutdown if necessary. The fixed inverter 116 is configured to convert the DC output into an AC signal suitable for conventional AC home appliances 118, such as refrigerators, air conditioners, or televisions. The fixed inverter 116 operates with a fixed topology and does not require real-time reconfiguration, relying instead on the upstream adaptability of the PV panel connections for optimal energy delivery.

In an embodiment, the microcontroller 106 balances power distribution between the DC and AC energy pathways by dynamically prioritizing loads based on user settings, appliance criticality, or battery state of charge, thereby optimizing system efficiency and ensuring uninterrupted operation.

Figure 2:
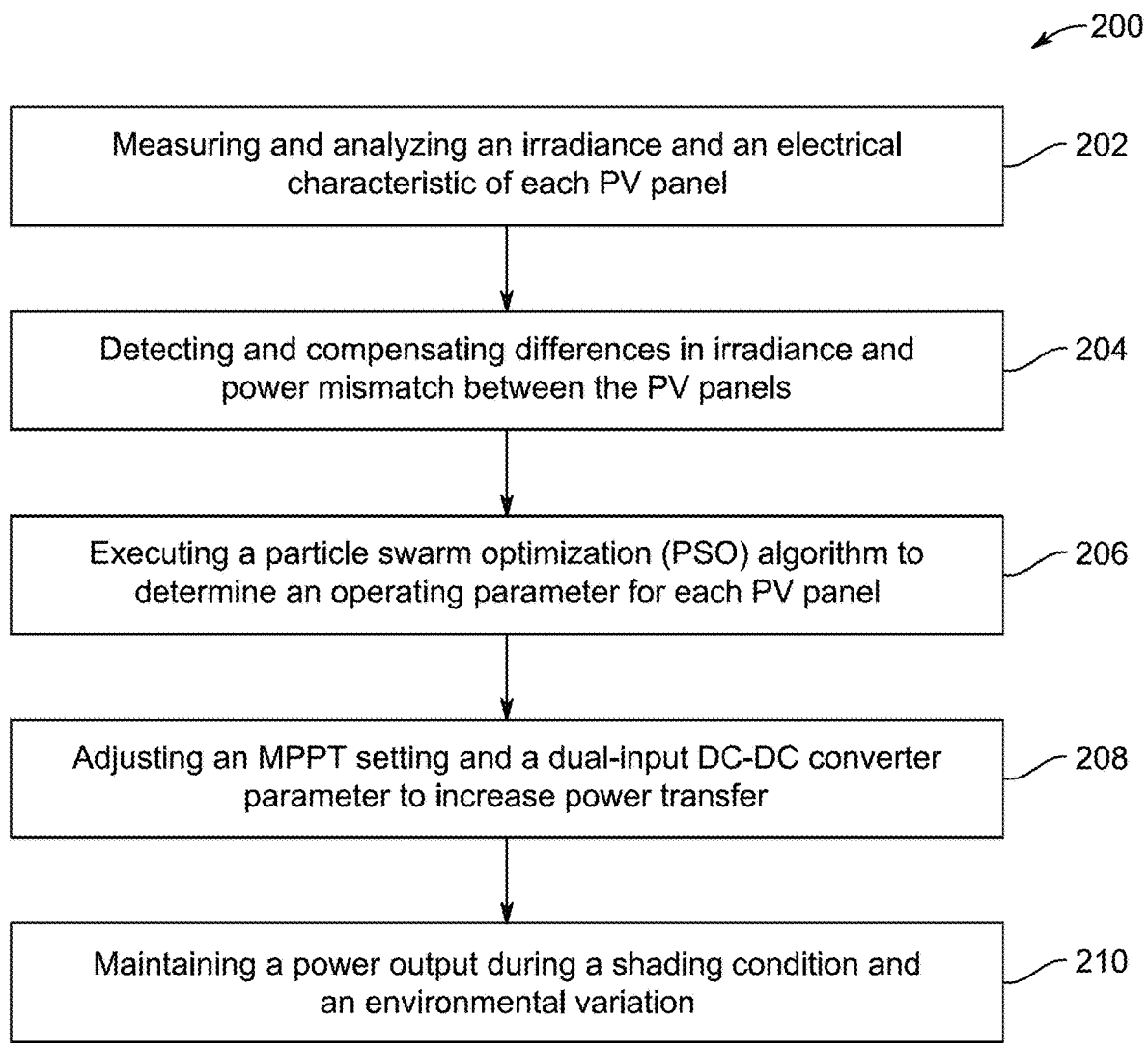
FIG. 2 illustrates an exemplary process flow of a method for controlling the PV power system, according to an embodiment of the present invention.

FIG. 2 illustrates a method 200 for controlling the photovoltaic (PV) power system 100, according to an embodiment of the present disclosure.

Step 202 includes measuring and analyzing the irradiance and electrical characteristics of each PV panel 102. The irradiance is obtained using the photodetector array 112, while electrical parameters such as voltage and current are measured using analog sensors (e.g., current shunt monitors and voltage dividers). The inputs are received by the microcontroller 106, which processes the irradiance and electrical data to evaluate the energy generation profile of each PV panel 102. In some examples, this evaluation may include calculating real-time power (P=IV) for each panel, enabling granular monitoring of panel health and environmental exposure.

Step 204 includes detecting and compensating for differences in irradiance and power mismatch between the PV panels 102. This step is performed by the microcontroller 106, which compares the power output of each PV panel 102 based on sensor inputs. If a significant mismatch is identified due to partial shading, soiling, orientation differences, or panel degradation, the microcontroller 106 takes corrective action to equalize the output by adjusting the duty cycle of the dual-input DC-DC converter 108 or by modifying the electrical configuration of the PV panels 102 via the switching matrix 104. In some implementations, the switching matrix 104 may toggle panel groupings between series and parallel modes to normalize voltage and current levels across the PV panel 102 array.

Step 206 includes executing the PSO algorithm to determine the optimal operating parameters for each PV panel 102. The PSO algorithm, executed by the microcontroller 106, evaluates multiple candidate duty cycle values and MPPT reference points using a fitness function based on system-wide power output. The algorithm iteratively converges on an optimal solution, which is then applied in real-time. Each particle in the swarm represents a potential MPPT setting, and the convergence process is influenced by historical performance (e.g., personal best) and peer performance (e.g., global best).

Step 208 includes adjusting the MPPT settings and dual-input DC-DC converter parameter based on the results from the PSO algorithm to increase power transfer from the PV panels 102. This step is executed by the microcontroller 106, which uses the optimized values determined by the PSO algorithm to send control signals to the MPPT circuit 103 and the dual-input DC-DC converter 108. In some examples, the converter 108 implements a control loop (e.g., feedback loop) reconfigured to operate in a current-mode or voltage-mode control depending on an optimal setpoint.

In some embodiments, the MPPT setting may include a reference voltage or current used to track the maximum power point of each PV panel 102. This setting can also determine how the PV panels 102 are grouped (e.g., in series or parallel) and whether a panel should be bypassed.

In some embodiments, the DC-DC converter setting may include values such as the duty cycle, phase delay, switching mode (e.g., buck, boost, or buck-boost), and other control parameters. These settings are selected by the microcontroller 106 using the PSO algorithm, which evaluates multiple combinations of values and selects the one that maximizes power output under current conditions (e.g., shading conditions, PV panel 102 mismatch conditions, and environmental variations).

Step 210 includes maintaining a stable power output during shading and environmental variations. The microcontroller 106 maintains the control loop that ensures voltage regulation and balanced power contribution from each PV panel 102. This dynamic adjustment allows the photovoltaic power system 100 to sustain reliable operation even under non-uniform irradiance conditions. In some implementations, when the PSO convergence fails, the fallback perturb and observe MPPT routine may activate to prevent loss of power tracking. In addition, the dual-input DC-DC converter 108 may temporarily prioritize stable output for critical DC loads while awaiting improved solar conditions.

Figure 3:
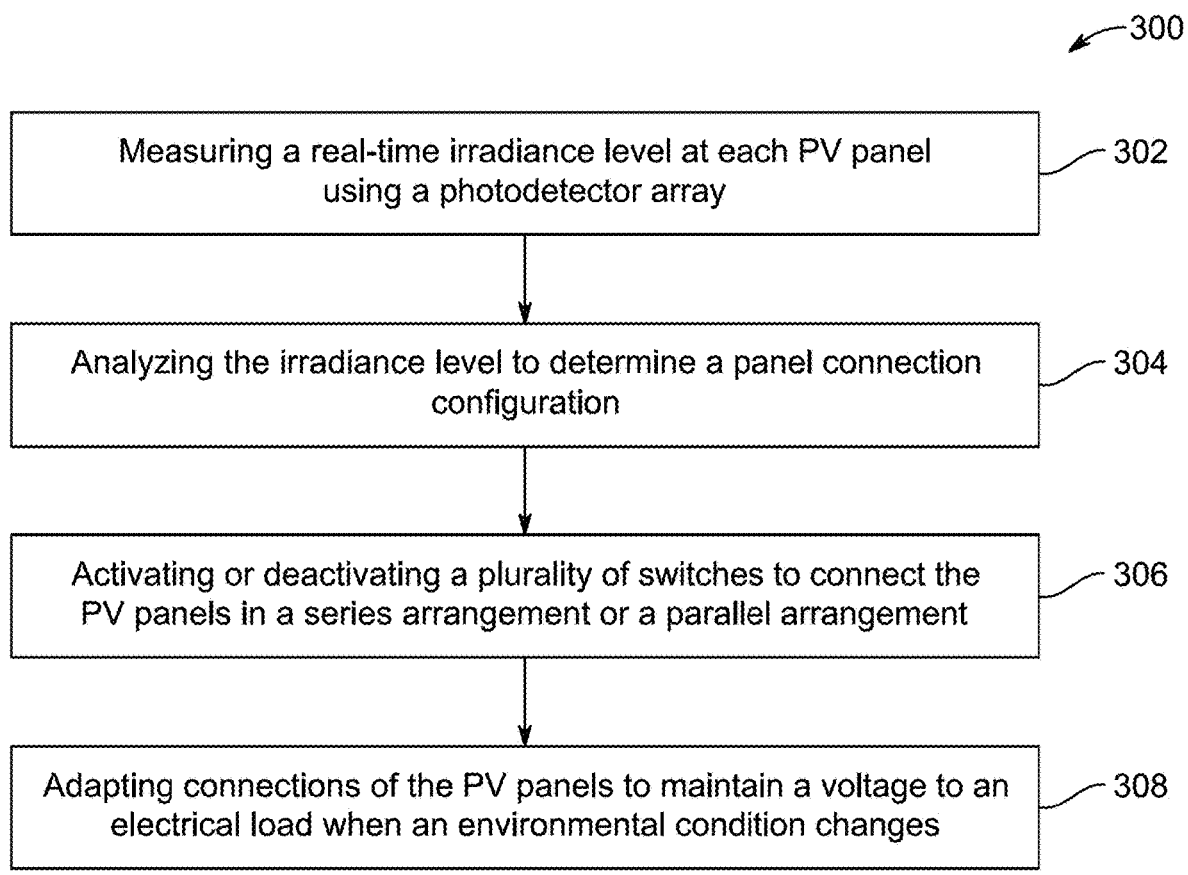
FIG. 3 illustrates an exemplary process flow of a method for reconfiguring connections between PV panels, according to an embodiment of the present invention.

FIG. 3 illustrates an exemplary process flow of a method for reconfiguring connections between the photovoltaic (PV) panels 102, according to an embodiment of the present invention.

In an embodiment, at step 302, the method 300 is implemented for reconfiguring connections between the PV panels 102. The method 300 begins by measuring the real-time irradiance level at each PV panel 102 using the photodetector array 112. The photodetector array 112 may include discrete photodiodes mounted on or near each panel to capture localized solar intensity. Preferably the photodetector array includes a plurality of photodiodes for each PV panel. For example, the photodetector array may include an array of photodiode arrays, with each PV panel having a discrete and/or independent array. Preferably each photodiode array is geometrically the same as other photodiode arrays in the system. In this respect, in one array, photodiodes may be mounted at a perimeter of the PV panel with a face exposure to measure irradiance insolating the PV panel. Optionally, the photodiodes may be mounted within the PV panel in a geometric array, such that, at a particular PVB panel latitude (height), one photodiode is mounted at a right most perimeter, one photodiode is mounted at a left most perimeter and two photodiodes are mounted between the perimeter diodes within the PV panel with all four photodiodes equidistant and colinear. A single PV panel may have a plurality of such photodiode latitudes preferably spaced equidistant along the height of the PV panel. The irradiance measurements are transmitted to the microcontroller 106, forming the basis for decision-making regarding power optimization and reconfiguration of the PV panel 102.

In an embodiment, at step 304, the irradiance data collected from each PV panel 102 is analyzed by the microcontroller 106 to determine a panel connection configuration, whether series, parallel, or a hybrid of the two. The analysis performed by the microcontroller 106 considers the current energy availability from each PV panel 102 and the voltage and current requirements of the electrical load or battery storage system. The analysis may incorporate a cost function or decision matrix that weights power output, system efficiency, and load demands. For instance, when irradiance is uniformly high, a series connection may be optimal to achieve higher voltages; conversely, under partial shading, a parallel or hybrid arrangement may yield better overall performance.

In an embodiment, at step 306, the method 300 continues by activating or deactivating the plurality of switches within the switching matrix 104 to connect the PV panels 102 in the series arrangement or the parallel arrangement. The microcontroller 106 generates specific control signals that operate solid-state switches associated with each PV panel 102. These switches may be implemented using MOSFETs or IGBTs rated for outdoor photovoltaic environments and are arranged to enable isolated or grouped isolations. By toggling the switches, the photovoltaic power system 100 physically reconfigures the electrical paths between the PV panels 102, dynamically altering the topology to match the configuration determined in step 304. This reconfiguration process is carried out with minimal transition delay and does not interrupt the ongoing power delivery to the electrical load.

In an embodiment, at step 308, the connections of the PV panels 102 are continuously adapted to maintain an appropriate voltage level for the electrical load when environmental conditions change. The environmental conditions may include variations (e.g., fluctuations) in sunlight due to moving clouds, shading, or time-of-day effects. The microcontroller 106 continuously monitors system voltage and irradiance inputs and adjusts the PV panel configuration accordingly to ensure that the electrical load receives consistent power. In some implementations, reconfiguration is triggered when irradiance levels fall below or rise above predefined thresholds, or when panel mismatch exceeds a defined tolerance (e.g., 10%). The adaptive reconfiguration implemented by the microcontroller 106 improves energy efficiency, maintains operational stability, and ensures the resilience of the photovoltaic power system 100 in real-world environments.

Figure 4A:
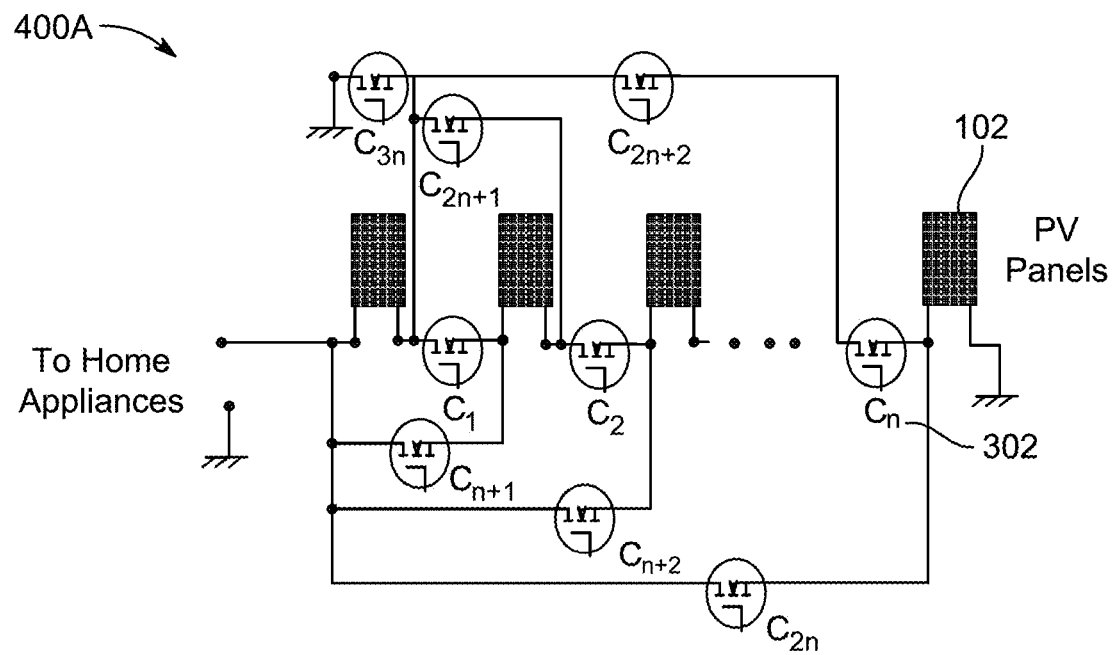
FIG. 4A illustrates a schematic diagram of a switching matrix for the PV panels under varying solar irradiance, according to an embodiment of the present invention.

FIG. 4A illustrates a schematic diagram 400A of the switching matrix 104 for the photovoltaic (PV) panels 102 under varying solar irradiance, according to an embodiment of the present invention.

The photovoltaic power system 100 is designed to optimize power extraction from the PV panels 102 while maintaining a fixed converter or inverter design.

As seen in FIG. 4A, the photovoltaic power system 100 includes 'n' PV panels 102, each individually monitored and controlled using a set of three electronic switches, resulting in a total of 3n switches. Each PV panel 102 is associated with three dedicated switching elements that allow dynamic reconfiguration of inter-panel connections. The 3n switches, represented by switching components denoted as $C_1$, $C_2, \ldots, C_n, C_{n+1}, \ldots, C_{2n}$, and $C_{2n+1}, \ldots, C_{3n}$ allow the electrical interconnection of the PV panels 102 to be selectively arranged in either series, parallel, or hybrid configurations.

In some examples, this modular switching design provides fine-grained control over each PV panel 102's contribution to the array, allowing full bypass, series addition, or parallel grouping based on real-time performance. The combination of switches enables not only inter-panel connectivity changes but also the possibility to bypass underperforming PV panels 102 due to shading or degradation.

Figure 4B:
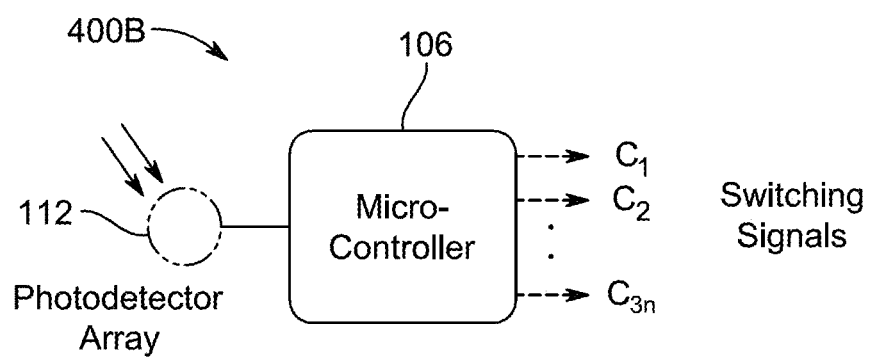
FIG. 4B illustrates a schematic diagram of an adaptation system for the PV panels under varying solar irradiance, according to an embodiment of the present invention.

The switching behaviour is governed by the microcontroller 106, which receives real-time input from the photodetector array 112, as disclosed in FIG. 4B.

FIG. 4B illustrates a schematic diagram 400B of an adaptation system for the PV panels 102 under varying solar irradiance, according to an embodiment of the present invention.

The photodetector array 112 is configured to monitor solar irradiance falling on each PV panel 102 independently. In some implementations, each photodetector may be integrated with a local analog-to-digital converter (ADC) to reduce noise and enhance sampling resolution. Based on the detected irradiance levels, the microcontroller 106 executes a control algorithm that determines which switches to activate or deactivate. Control signals, denoted as $C_1, C_2, \ldots, C_n, C_{n+1}, \ldots, C_{2n}$, and $C_{2n+1}, \ldots, C_{3n}$, are then dispatched to the corresponding switches to reconfigure a PV network accordingly.

In some implementations, the microcontroller 106 analyzes irradiance data and selects the most efficient interconnection topology for the current environmental condition. For example, during uniform sunlight conditions, the microcontroller 106 may connect the PV panels 102 in series to increase the output voltage. Under partial shading, the microcontroller 106 may choose a parallel or mixed configuration to equalize current output and minimize mismatch losses.

In some embodiments, the switching decision logic may also incorporate historical performance data, temperature sensors, or battery charge state to further refine configuration selection.

The switching matrix 104 feeds directly into the electrical load or DC home appliances 110, allowing the photovoltaic power system 100 to respond adaptively to changes in solar irradiance without altering the characteristics of the fixed inverter or the dual-input DC-DC converter 108. This separation of adaptive front-end configuration from fixed back-end components simplifies system integration while maximizing energy harvesting across varied environmental conditions.

Figure 5:
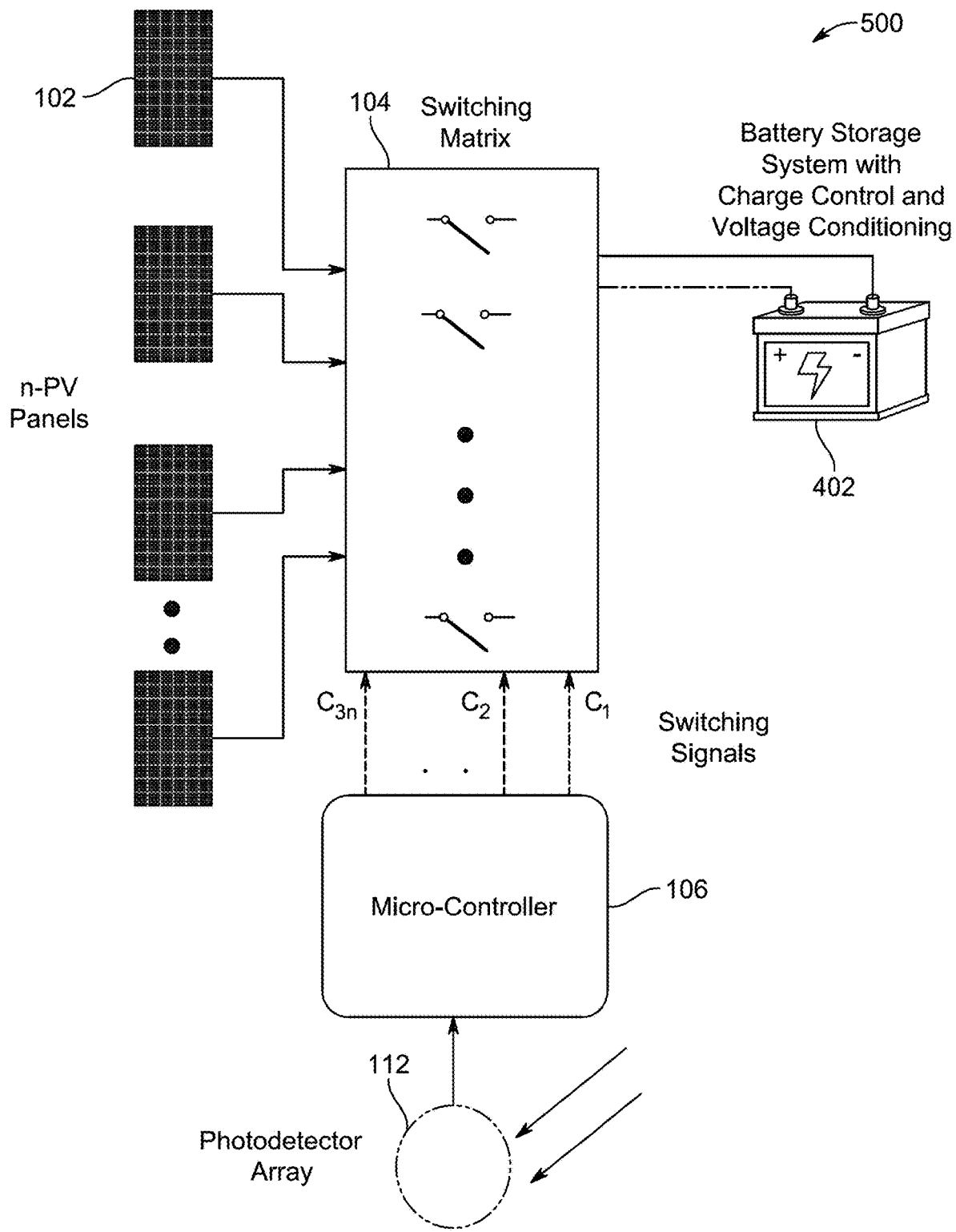
FIG. 5 illustrates an exemplary architecture of a system for charging batteries using reconfigured PV panels during daytime, according to an embodiment of the present invention.

FIG. 5 illustrates an exemplary architecture 500 of the photovoltaic power system 100 for charging batteries of the battery storage system 402 using a reconfigured photovoltaic (PV) panel 102 during daytime, according to an embodiment of the present invention. FIG. 5 builds upon the adaptive switching matrix 104 as illustrated in FIG. 4A.

The photovoltaic power system 100 is configured to charge the battery storage system 402 during daytime using reconfigurable connections of the PV panels 102. During the daytime, the PV panels 102 are adjusted through the switching matrix 104 to deliver a stable and suitable voltage to charge the battery storage system 402 efficiently. The dynamic adjustment may involve selecting series, parallel, or hybrid panel arrangements, based on real-time irradiance data. The charging configuration is determined and implemented by the microcontroller 106, which allows the PV panels 102 to adapt to varying sunlight conditions by reconfiguring their connections (series or parallel) to maintain optimal power delivery. The output of the switching matrix 104 is directly connected to the battery storage system 402, which includes charge control logic, battery management circuitry, and voltage conditioning components, ensuring that the stored energy is properly regulated for safe and efficient charging. The adaptive reconfiguration ensures that the battery storage system 402 is charged at a consistent voltage, regardless of variations in solar irradiance or shading conditions, while operating the PV panels 102 at the MPPT, thereby enabling each panel to operate at or near the MPPT. In some embodiments, the microcontroller 106 executes MPPT control algorithms in real-time, adjusting the switching configuration and converter settings based on irradiance and battery state-of-charge. The microcontroller 106 and the photodetector array 112 ensure that the PV panels 102 operate at their MPPT, optimizing energy transfer to the battery storage system 402 for nighttime use.

By optimizing the configuration of the PV panels 102 in real time, the photovoltaic power system 100 ensures a stable voltage supply to the battery storage system 402 even when the individual panel outputs fluctuate. This system-level coordination helps reduce the impact of partial shading and panel mismatch, resulting in improved energy conversion efficiency.

The exemplary architecture 500 of the photovoltaic power system 100, therefore, demonstrates how the adaptive PV panel switching concept can be extended to efficiently charge battery storage systems during the daytime, ensure energy availability during nighttime or periods of poor solar availability, and maintain consistent and optimal energy flow. Additionally, reduced complexity translates into low running and maintenance costs, making the photovoltaic power system 100 a practical and reliable solution for off-grid or remote areas where access to conventional power infrastructure is limited.

Figure 6:
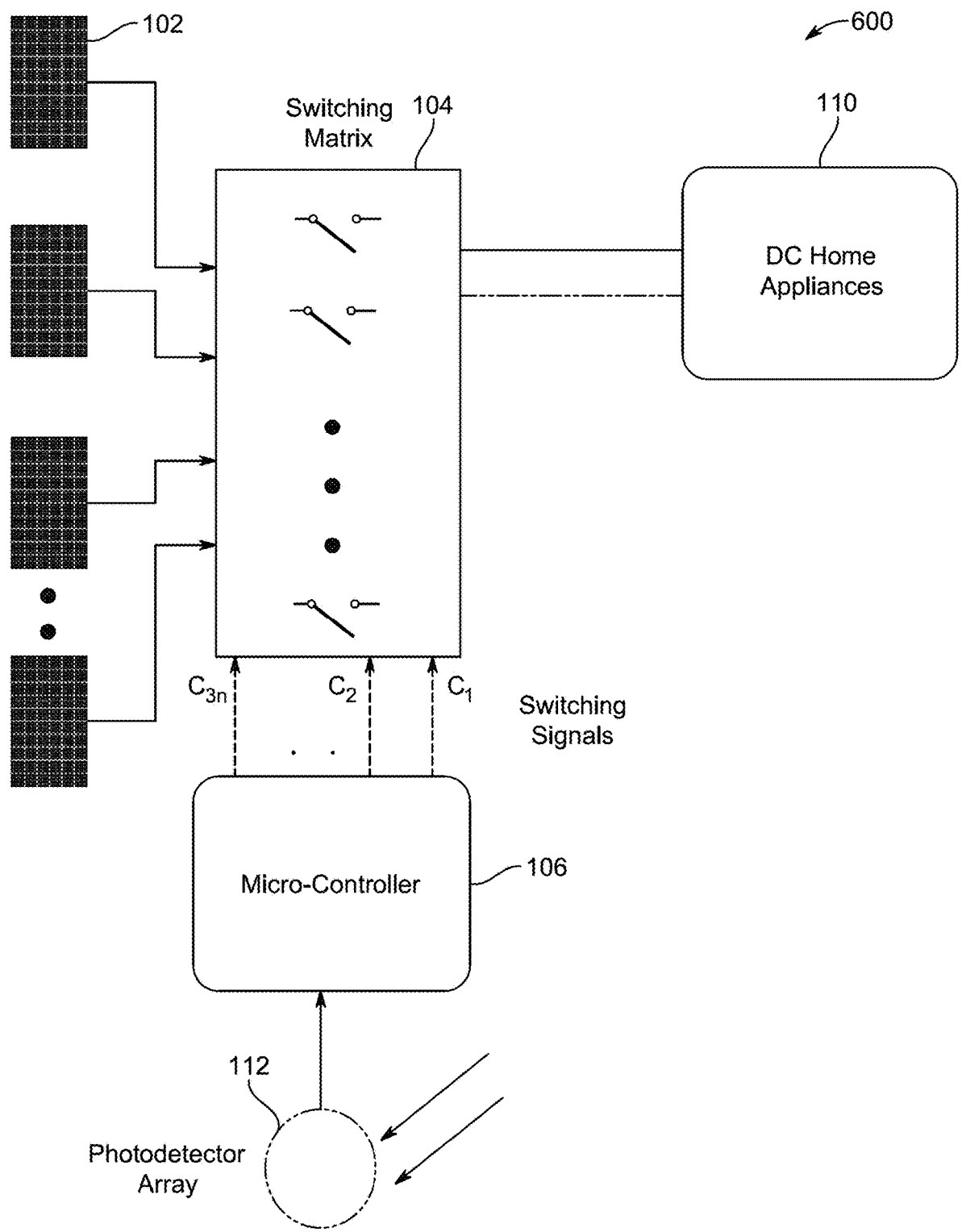
FIG. 6 illustrates another exemplary architecture of the system for directly powering DC home appliances using the reconfigured PV panels, according to an embodiment of the present invention.

FIG. 6 illustrates another exemplary architecture 600 of the photovoltaic power system 100 for directly powering the DC home appliances 110 using the reconfigured PV panels, according to an embodiment of the present invention.

The photovoltaic power system 100 comprises a plurality of PV panels 102, whose outputs are routed through the centrally controlled switching matrix 104. The switching matrix 104 is capable of modifying the electrical interconnections among the plurality of PV panels 102 to form series, parallel, or hybrid configurations depending on environmental conditions and load requirements. Each configuration determines the output voltage and current profile of the array to match the operational demands of the connected DC home appliance 110.

The microcontroller 106 acts as the central control unit and governs the switching operation by generating real-time control signals denoted as $C_1, C_2, \ldots, C_n, C_{n+1}, \ldots, C_{2n}$, and $C_{2n+1}, \ldots, C_{3n}$ which are then delivered to the switching matrix 104. The control signals dictate the activation or deactivation of specific switches to reconfigure the PV panel 102 connections dynamically. The decision-making logic within the microcontroller 106 is based on irradiance data supplied by the photodetector array 112, which continuously monitors the intensity of sunlight incident on each PV panel 102.

As irradiance conditions change due to shading, cloud movement, or time-of-day variation, the microcontroller 106 analyzes the irradiance data and updates the PV panel 102 connections accordingly. By adjusting the configuration in real time, the photovoltaic power system 100 ensures the PV array operates close to the MPPT, thereby maximizing power extraction and maintaining a stable voltage output suitable for directly powering the DC appliances 110.

The system supports a wide range of DC appliances, such as LED lighting, fans, communication devices, and compact refrigeration units. This approach compensates for variations in shading, sunlight intensity, and other environmental factors, providing reliable and efficient energy delivery to household appliances. This configuration is particularly suited for off-grid or remote areas, offering a cost-effective and easy-to-maintain solution for renewable energy utilization.

Figure 7:
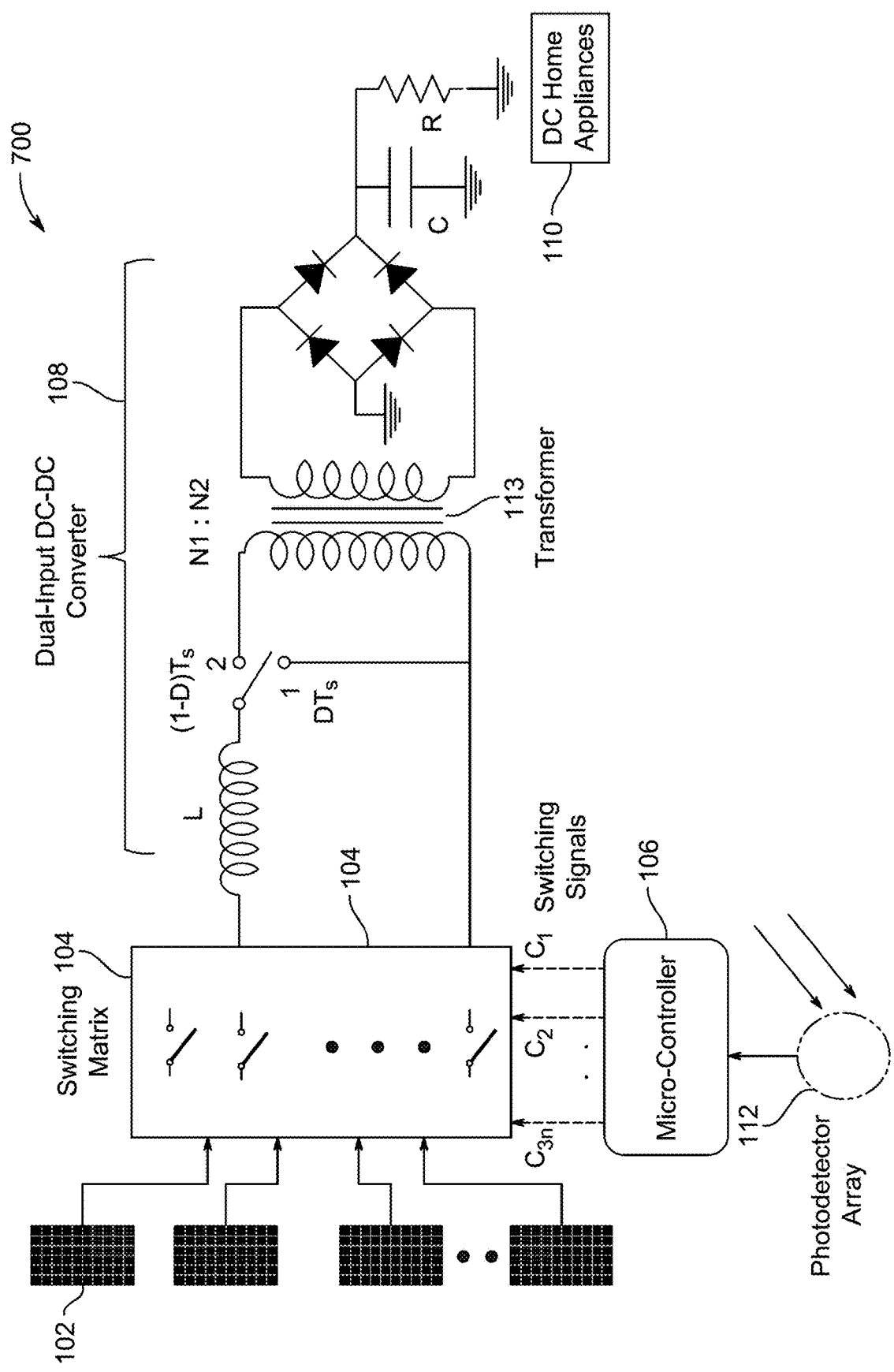
FIG. 7 illustrates another exemplary architecture of the system for powering DC home appliances with a dual-input DC-DC converter, according to an embodiment of the present invention.

FIG. 7 illustrates another exemplary architecture of the photovoltaic power system 100 for powering the direct current (DC) appliances 110 with the dual-input DC-DC converter 108, according to an embodiment of the present invention. The configuration builds upon the reconfigurable panel network described in previous figures, introducing a power conditioning stage that ensures compatibility with appliances requiring precise and stable voltage and current levels.

The PV panels 102 are connected through the switching matrix 104, dynamically managed by the microcontroller 106 that receives solar irradiance data from the photodetector array 112. As in previous figures, the microcontroller 106 sends switching signals denoted as $C_1, C_2, \ldots, C_n$, $C_{n+1}, \ldots, C_{2n}$, and $C_{2n+1} \ldots, C_{3n}$ to control the panel topology in real time, allowing the array to operate at or near the MPPT despite environmental variability.

In contrast to, the direct-connection design shown in earlier figures, the output from the switching matrix 104 in this configuration feeds into the dual-input DC-DC converter 108 that includes a high-frequency isolation transformer with a primary-to-secondary turns ratio of N1:N2. The dual-input DC-DC converter 108 operates with a fixed switching frequency $f_s$ and switching period $T_s=1/f_s$, where the duty cycle D defines the relative ON-time of the switch.

The converter topology of the dual-input DC-DC converter 108 may follow a push-pull, full-bridge, or forward-type converter, depending on the power level and application requirements. On the input side, the dual-input DC-DC converter 108 includes an inductor L and a semiconductor switch driven at the defined duty cycle D. During the ON portion of the cycle (DTs), energy is stored in the magnetic components and then transferred to the load through the transformer during the OFF portion $(1-D_i)T_s$. The transformer isolates and steps the voltage appropriately to match the load requirements.

The output stage comprises a rectifying diode bridge, a capacitor C for smoothing the output voltage, and a resistive load R representing the connected DC home appliance. This combination ensures that a stable, low-ripple voltage is supplied to sensitive electronics, even as input conditions from the PV panels 102 fluctuate.

By integrating the dual-input DC-DC converter 108, the photovoltaic power system 100 enhances its adaptability while preserving the benefits of simplicity and cost-effectiveness. This approach is especially useful in powering a diverse set of DC home appliances 110 with varying power ratings and voltage requirements, making it well-suited for modern off-grid or hybrid residential systems.

Figure 8:
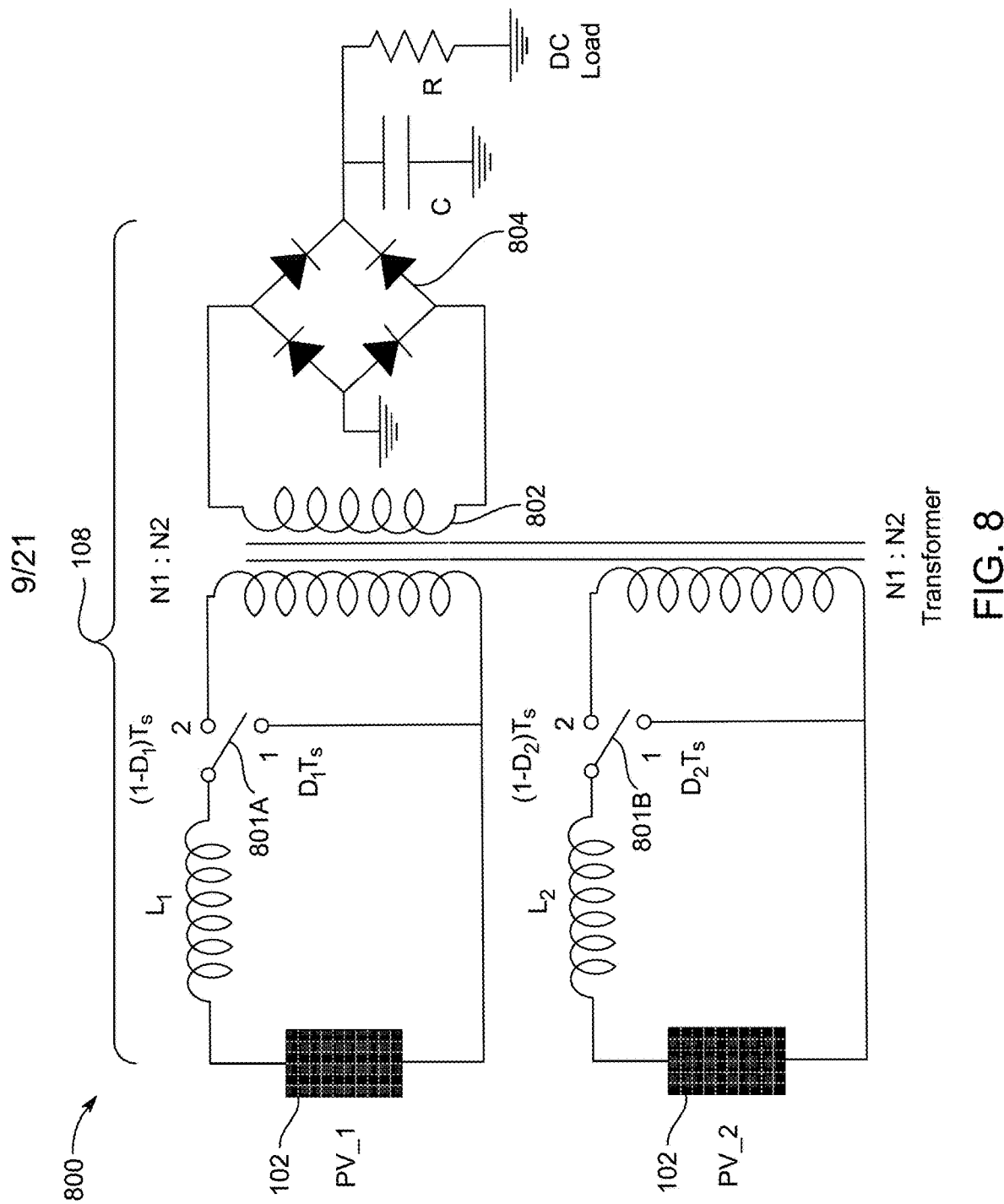
FIG. 8 illustrates an exemplary architecture of a dual-input direct current (DC-DC) converter configured to integrate two PV panels operating under different irradiance conditions, according to an embodiment of the present invention.

FIG. 8 illustrates an exemplary architecture 800 of the dual-input direct current (DC-DC) converter 108 configured to integrate two PV panels 102 operating under different irradiance conditions, according to an embodiment of the present invention. FIG. 8 discloses reconfiguring PV panel connections while integrating the dual-input DC-DC converter 108 design for enhanced flexibility and efficiency.

The architecture 800 comprises two or more PV panels 102, labeled as PV_1 and PV_2, each PV panel 102 is paired with inductors ($L_1$ and $L_2$) and controlled switches 801A and 801B. The switches 801A and 801 B are operated at duty cycles $D_1$ and $D_2$, respectively. Each switching cycle has a total duration $T_s$, with an ON-period of $D_iT_s$ and an OFF-period of $(1-D_i)T_s$. The independent control of switches 801A and 801 B enables each PV panel 102 to operate at optimal switching conditions, compensating for differences in irradiance or shading between PV panels 102.

A high-frequency transformer 802 couples the primary stages of both inputs to a common output stage. The transformer 802 features a turn ratio of N1:N2, enabling proper voltage scaling and isolation. On the secondary side, a full-bridge diode rectifier 804, followed by a smoothing capacitor C and a resistive load R, delivers stable DC power to the connected load. This configuration ensures combined energy delivery from both PV panels 102 with minimal ripple and high efficiency.

The architecture 800 enables dynamic modulation of both the duty cycle and the phase shift between the switching signals for PV_1 and PV_2. In some implementations, the system introduces a phase offset between the control signals to temporally separate the energy contributions of each panel, further reducing interference and ripple current. This modulation strategy supports efficient energy harvesting even under highly asymmetric solar conditions.

The architecture 800 handles the PV panels 102 with differing outputs, such as those caused by varying shading conditions. The duty cycle of each switch 801A, 801B is independently controlled, and the phase lag or lead between their switching cycles is optimized to maximize power extraction from each PV panel 102.

To optimize control, the system 100 can leverage heuristic optimization algorithms, particularly the PSO algorithm. The PSO algorithm identifies the ideal duty cycle and phase shift combinations that maximize power output while balancing mismatches in irradiance. Even if one PV panel 102 is partially shaded or underperforming, the other PV panel 102 can continue operating efficiently, with PSO ensuring balanced energy extraction from the system.

One of the key advantages of the architecture 800 is the independent control of the switching circuit for each PV panel 102. This enables the architecture 800 to dynamically adapt to the unique operating conditions of each PV panel 102, allowing optimized power harvesting even when partial shading affects one or both PV panels 102 differently.

In contrast to conventional systems requiring separate converters per panel, architecture 800 uses a single dual-input converter, significantly reducing the number of required components. This reduction lowers the cost of the photovoltaic power system 100, simplifies design, and enhances reliability by minimizing failure points. Compared to alternative designs that utilize separate converters for each PV panel 102, this approach is more cost-effective and robust.

Figure 9:
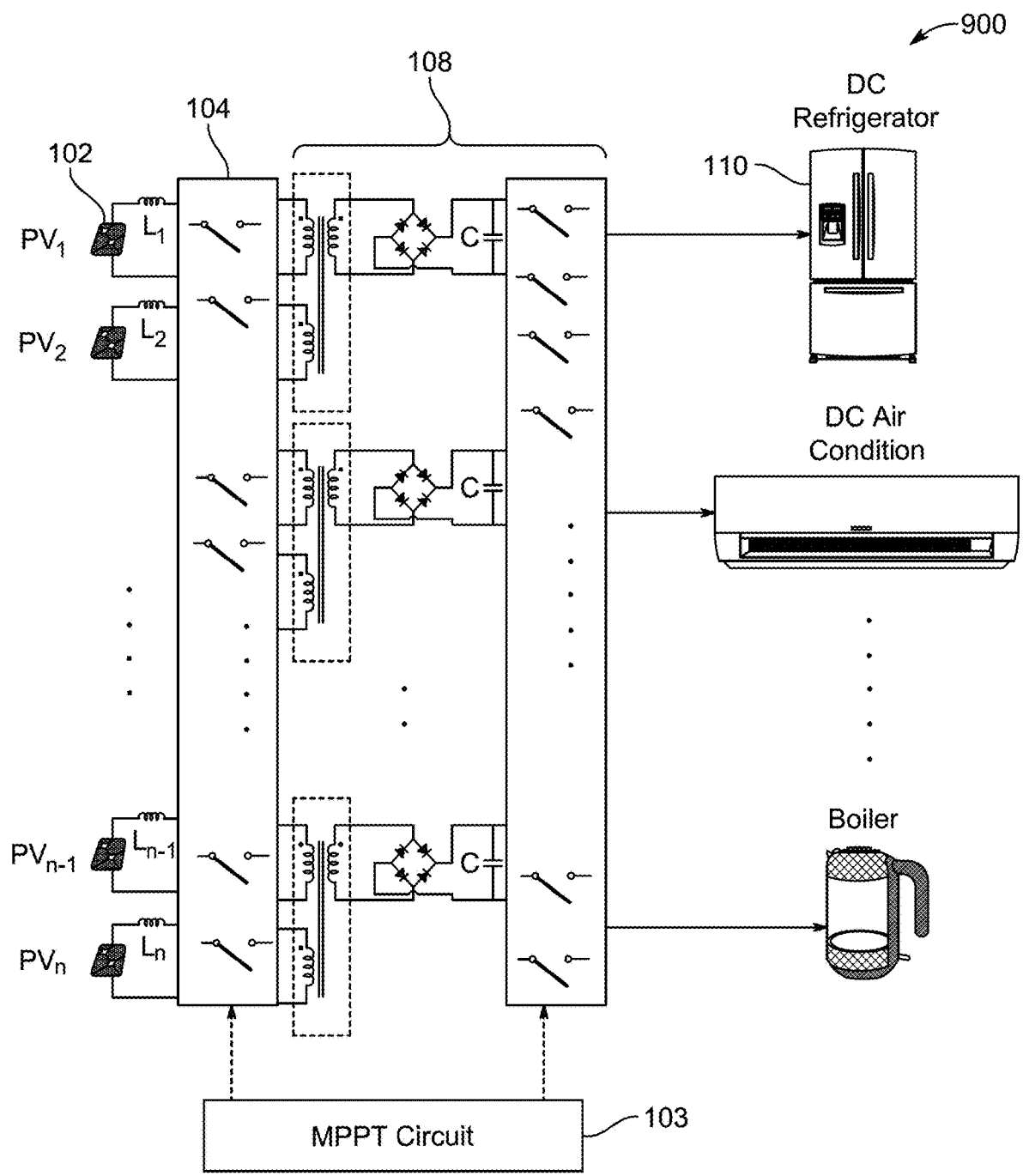
FIG. 9 illustrates an exemplary architecture for integrating PV panels with a plurality of home appliances via a controlled dual-input direct current (DC-DC) converter, according to an embodiment of the present invention.

FIG. 9 illustrates an exemplary architecture 900 for integrating PV panels with a plurality of home appliances via the controlled dual-input DC-DC converter 108, according to an embodiment of the present invention. The MPPT circuit 103 autonomously adjusts the array of switches provided in the switching matrix 104, thereby ensuring a stable and adaptive flow of electricity to the plurality of DC appliances 110. The MPPT circuit 103 compensates for variations in power output due to fluctuating shading and irradiance conditions on the PV panels 102, maintaining a consistent energy supply to the plurality of DC home appliances 110.

Each of the PV panels 102 (e.g., $PV_1$, $PV_2$, ..., $PV_a$) are connected to an inductor ($L_1$, $L_2$, ..., $L_a$) and a dedicated switching stage. The switches control the connection to the dual-input DC-DC converters 108, each dual-input DC-DC converter 108 is equipped with the full bridge diode rectifier and an output smoothing capacitor. The dual-input DC-DC converters 108 tailor the output voltage and current to meet the specific requirements of their connected appliances.

Furthermore, the MPPT circuit 103 monitors a combination of real-time irradiance conditions and load demands from each DC home appliance 110. In some examples, the photodetector array 112 (not shown) captures real-time irradiance conditions to be used by the MPPT circuit 103. The MPPT circuit 103 uses this data to issue switching commands that selectively route power from the PV panels 102 to the dual-input DC-DC converters 108. This decision-making is based on optimizing overall energy utilization and appliance priority, while compensating for localized shading, panel mismatch, or partial load availability.

The MPPT circuit 103 not only adjusts individual duty cycles and switching sequences but also manages the dynamic allocation of the PV panels 102 to different converter inputs, tailoring each PV output to appliance-specific needs. This allows the photovoltaic power system 100 to ensure maximum energy harvesting across the PV panels 102, even under heterogeneous conditions, while maintaining a stable and uninterrupted power supply to critical household devices.

Compared to static or rule-based controllers, the MPPT circuit 103 introduces adaptive intelligence, capable of learning patterns in solar availability and consumption trends to further optimize energy routing. Additionally, the architecture 900 allows a single processor to manage and reconfigure connections for the PV panels 102 and the dual-input DC-DC converters 108, thereby reducing complexity and cost while increasing scalability and fault tolerance of the photovoltaic power system 100.

In some implementations, each of the PV panels 102 are monitored for open-circuit voltage and short-circuit current anomalies. When either metric deviates beyond ±20%, the microcontroller 106 raises a fault flag and actuates the corresponding bypass switch, while logging the event over an SPI diagnostic interface.

EXAMPLES

In this section, the detailed analysis of the dual-input DC-DC converter 108, including the fixed-duty-cycle configuration that adapts the reconfigured connections of the PV panels 102, is presented. At the beginning, a case of two PV panels 102, subject to different sun illumination, connected to the same converter circuit, is presented. Afterwards, the experimental results carried out on a dual-input reconfigured DC-DC converter are presented.

The PSO algorithm is applied to the case study summarized in Table 1, searching for the duty cycle of each switch $D_1$ and $D_2$, and the optimum delay $\Delta\tau$ between the two switching patterns. It is found that for one set of solutions, $D_{1\text{-}opt}=0.33$, and $D_{2\text{-}opt}=0.179$, and the delay time of the second switching pattern relative to the first switching pattern $\Delta\tau=-1.54$ μs. It is worth noting that the Particle Swarm Optimization (PSO) algorithm achieves the optimal solution in a fraction of a second, demonstrating the ability of the system to adapt to environmental variations and adjust its parameters in real-time with minimal delay.

TABLE 1

The parameters of the dual-input DC-DC converter circuit under different conditions of the two PV panels.

| | |
|---|---|
| $V_{g1\_MPPT}$ | 18 V |
| $V_{g2\_MPPT}$ | 14 V |
| $I_{g1\_MPPT}$ | 5.5 A |
| $I_{g2\_MPPT}$ | 4 A |
| Load Resistance R | 2 W |
| Switching Frequency $f_s$ | 50 kHz |
| $L_1$, $L_2$ | 5 mH |
| Transformer Turns Ratio N1/N2 | 4 |

Analysis of the Dual-Input DC-DC Adaptive Converter Circuit

In the analysis, the superposition on the circuit of FIG. 8 is applied by considering each PV source/PV panel 102 separately. This assumption is based on considering the magnetic circuit of the transformer behaving in a linear manner (assuming a linear relationship between magnetic field intensity (H) and magnetic flux density (B) in the core material). Magnetic coupling between coils in the primary side of the transformer is neglected.

Figure 11A:
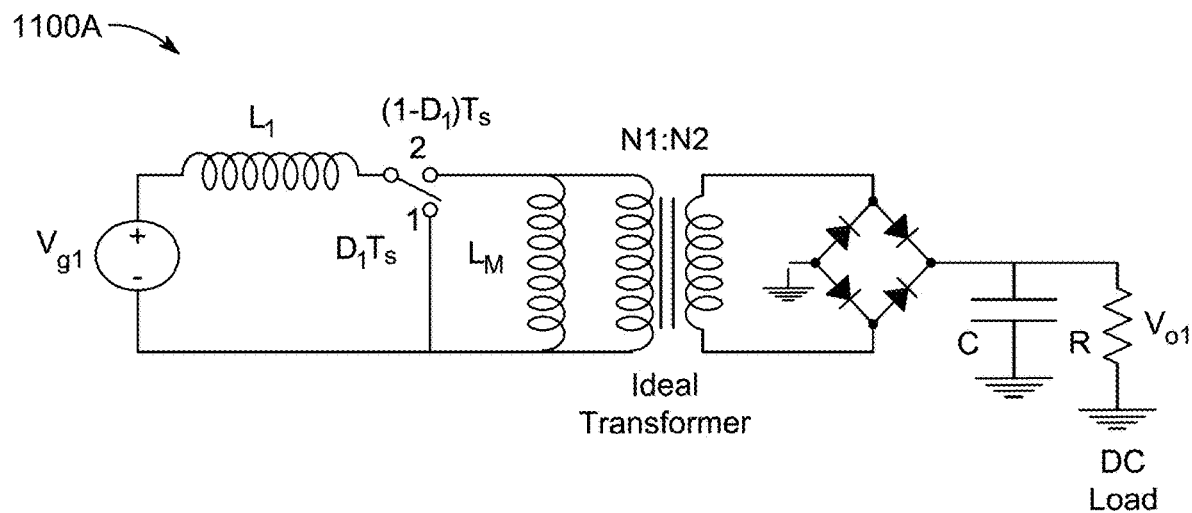
FIG. 11A illustrates an exemplary architecture of the dual-input isolated DC-DC converter, considering only one PV source, according to an embodiment of the present invention.
Figure 11B:
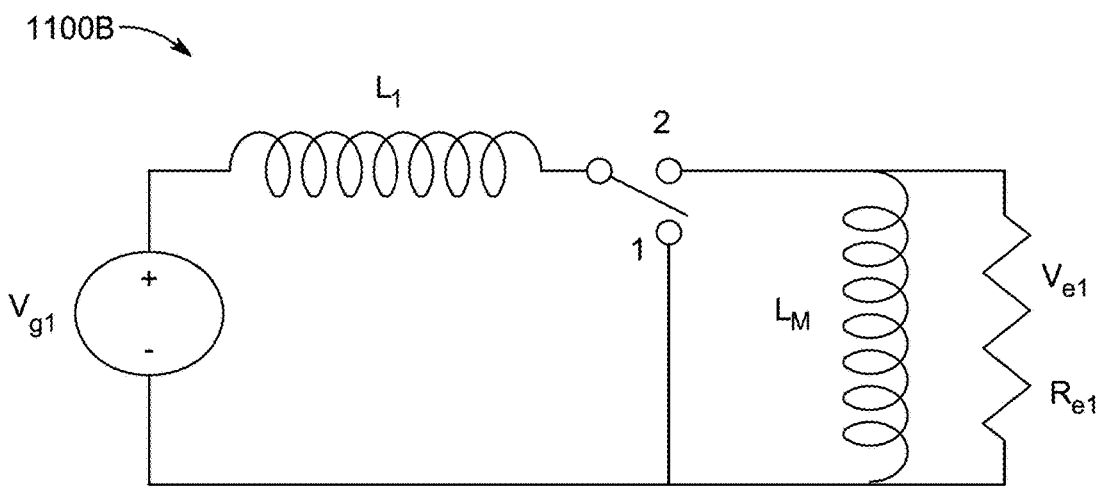
FIG. 11B illustrates another exemplary architecture of the dual-input isolated DC-DC converter, referring to the primary side of the transformer, according to an embodiment of the present invention.
Figure 11C:
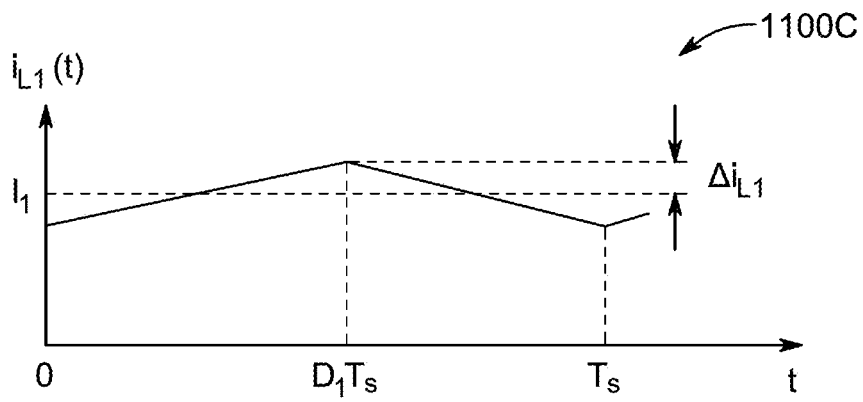
FIG. 11C illustrates a graphical representation architecture illustrating a current waveform of inductor $L_1$ of the dual-input isolated DC-DC converter, according to an embodiment of the present invention.

Considering only $PV_1$ the circuit is reduced as shown in FIGS. 11A-11C.

FIG. 11A illustrates a system architecture 1100A of the dual-input isolated DC-DC converter 108 considering one PV panel 102, according to an embodiment of the present invention.

Where $L_M$ accounts for transformer core magnetization. Referring circuit elements to the primary side of the transformer is shown in FIG. 11B, where Re is the equivalent load resistance referred to a primary side of the transformer.

FIG. 11B illustrates another exemplary architecture 1100B of the dual-input isolated DC-DC converter 108, referring to the primary side of the transformer, according to an embodiment of the present invention. FIG. 11B is the equivalent circuit diagram of the circuit in FIG. 11A referring to the primary side of the transformer.

Inductor voltage when switch is at position 2, equal to $$v_{L1}=V_{g1}-v_{e1} \tag{1}$$

Where $V_{g1}$ is the voltage available at $PV_1$ output

Inductor voltage when switch is at position 1 (FIG. 11D), equal to $$v_{L1}=V_{g1} \tag{2}$$

Since net volt-sec applied to inductor $L_1$ equal to zero, leads to $$V_{g1}D_1+(V_{g1}-v_2)(1-D_1)=0 \tag{3}$$

Where $v_2$ is the voltage level corresponding to $v_{e1}$ when switch is at position 2. From this equation we evaluate $v_2$ as, $$v_2 = V_{g1}/(1-D_1) \quad (4)$$

When applying net volt-sec to inductor $L_M$ and equating it to zero, we get $$-v_1 D_1 + \frac{V_{g1}}{(1-D_1)}(1-D_1) = 0 \quad (A5)$$

Where $-v_1$ is the voltage level corresponding to $v_{e1}$ when switch is at position 1. From this equation, we get the value of $v_1$ as, $$v_1 = \frac{V_{g1}}{D_1} \quad (6)$$

The maximum deviation in inductor current from its DC value $I_1$ (FIG. 11C), is $$\Delta i_{L1} = \frac{V_{g1} D_1 T_S}{2L_1} \quad (7)$$

The search algorithm reaches two sets of solutions, and according to relation (7), the solution with the smallest D values is retained to minimize fluctuation around the DC current value and hence fluctuations around maximum power point.

The Fourier series of the rectangular pulse train, amplitude A and duty cycle D, is $$AD + \sum_{m=1}^{\infty} \frac{2A}{m\pi} \sin(m\pi D) \cos\left(\frac{2\pi}{T_S}\left(t + \frac{DT_S}{2}\right)\right) \quad (8)$$

In general, first harmonic amplitude of a pulse train equals $$\frac{2(\text{peak to peak of pulse train})}{\pi} \sin(\pi D_1) \quad (9)$$

with a $$\text{delay time} = \frac{DT_S}{2}$$

with respect to the leading edge of the pulse train.

To synchronize the two switching first harmonics of the two PV sources, the switching pattern whose time delay is smaller should be delayed by the difference of the two delays $$\Delta \tau = \frac{(D_2 - D_1)T_S}{2},$$

phase lag $\theta = \pi(D_2 - D_1)$.

The RMS value of $v_{e1}$ is calculated through the following equation, $$\frac{1}{T_S}\int_0^{T_S} v_{e1}^2 dt = V_{e1}^2 \quad (10)$$

Referring to FIG. 11C), $$V_{e1}^2 = \frac{1}{T_S}\left\{\frac{V_{g1}^2}{D_1^2}DT_S + \frac{V_{g1}^2}{(1-D_1)^2}(1-D_1)T_S\right\} \quad (11)$$

which reduces to, $$V_{e1}^2 = \frac{V_{g1}^2}{D_1(1-D_1)} \quad (12)$$

Amplitude of first harmonic of $v_{e1}$ is $$\frac{1}{\left(\frac{N_1}{N_2}\right)}\left(\frac{V_{g1}}{1-D_1} + \frac{V_{g1}}{D_1}\right)\frac{2}{\pi}\sin(\pi(1-D_1)) = V_{o1} \quad (13)$$

Where $$\left(\frac{N_1}{N_2}\right)$$

is transformer turns ratio. Amplitude of first harmonic at transformer secondary terminals, and hence DC voltage at load, is $$V_{o1} = \frac{2}{\pi\left(\frac{N_1}{N_2}\right)}\frac{V_{g1}}{D_1(1-D_1)}\sin(\pi(1-D_1)) \quad (14)$$

which reduces to, $$V_{o1} = \frac{2}{\pi\left(\frac{N_1}{N_2}\right)}\frac{V_{g1}}{D_1(1-D_1)}\sin(\pi(1-D_1)) \quad (15)$$

since power delivered to $R_{e1}$ equal to the power delivered to R, hence $$\frac{V_{o1}^2}{R} = \frac{V_{e1}^2}{R_{e1}} \quad (16)$$

from this equation we reach an expression for $R_{e1}$ $$R_{e1} = \frac{\left(\frac{N_1}{N_2}\right)^2 D_1(1-D_1)}{\sin^2(\pi(1-D_1))}\frac{\pi^2}{4}R \quad (17)$$

for a lossless converter circuit, $$\frac{V_{e1}^2}{R_e} = V_{g1} I_1 \quad (18)$$

then, $$I_1 = \frac{V_{g1}}{D_1(1-D_1)R_{e1}} \quad (19)$$

Therefore, the equivalent input resistance to this converter is $$R_{in} = D_1(1-D_1)R_{e1} \quad (20)$$

Converter gain coefficient $M_1$ for a single PV source $$M_1 = \frac{V_{o1}}{V_{g1}} = \frac{2}{\pi\left(\frac{N_1}{N_2}\right)D_1(1-D_1)} \sin(\pi(1-D_1)) \quad (21)$$

Applying superposition, $$V_o = \quad (22)$$

$$\frac{V_{g1}}{2\left(\frac{N_1}{N_2}\right)D_1(1-D_1)} \sin(\pi(1-D_1)) + \frac{V_{g2}}{2\left(\frac{N_1}{N_2}\right)D_2(1-D_2)} \sin(\pi(1-D_2))$$

To match the converter with each solar source at the maximum power point tracking (MPPT), $$\frac{V_{g1\_MPPT}}{D_1(1-D_1)R_{e1}} = I_{MPPT1} \quad (23)$$

$$\frac{V_{g2\_MPPT}}{D_2(1-D_2)R_{e2}} = I_{MPPT2}$$

The algorithm searches for the duty cycles $D_1$, and $D_2$ of the switching signals applied to switches of each solar panel section subject to the following:

$$V_{g1} = V_{g1\_MPPT} \quad (24)$$

$$V_{g2} = V_{g2\_MPPT}$$

$$R_{e1} = \frac{\left(\frac{N_1}{N_2}\right)^2 D_1(1-D_1)}{\sin^2(\pi(1-D_1))} \frac{\pi^2}{4} R, \quad I_{1\_MPPT} = \frac{V_{g1\_MPPT}}{D_1(1-D_1)R_{e1}}$$

$$R_{e2} = \frac{\left(\frac{N_1}{N_2}\right)^2 D_2(1-D_2)}{\sin^2(\pi(1-D_2))} \frac{\pi^2}{4} R, \quad I_{2\_MPPT} = \frac{V_{g2\_MMPT}}{D_2(1-D_2)R_{e2}}$$

$$\Delta\tau = \frac{(D_2-D_1)T_s}{2}, \quad \theta = \pi(D_2-D_1)$$

The PSO algorithm searches the minimum of the two following equations, $$\min\left\{R_{in\_1} - \frac{V_{g1\_MPPT}}{I_{1\_MPPT}}\right\} \quad (25)$$

-continued $$\min\left\{R_{in\_2} - \frac{V_{g2\_MPPT}}{I_{2\_MPPT}}\right\}$$

or, replacing $R_{in1}$ from equations (A20, and A24), and similar relations for $R_{in2}$, $$\min\left\{\left[\frac{\left(\frac{N_1}{N_2}\right)\pi D_1(1-D_1)}{2\sin(\pi(1-D_1))}\right]^2 R - \frac{V_{g1\_MPPT}}{I_{1\_MPPT}}\right\} \quad (26)$$

$$\min\left\{\left[\frac{\left(\frac{N_1}{N_2}\right)\pi D_2(1-D_2)}{2\sin(\pi(1-D_2))}\right]^2 R - \frac{V_{g2\_MPPT}}{I_{2\_MPPT}}\right\}$$

FIG. 11C illustrates a graphical representation 1100C architecture illustrating a current waveform of inductor $L_1$ of the dual-input isolated DC-DC converter, according to an embodiment of the present invention.

Figure 11D:
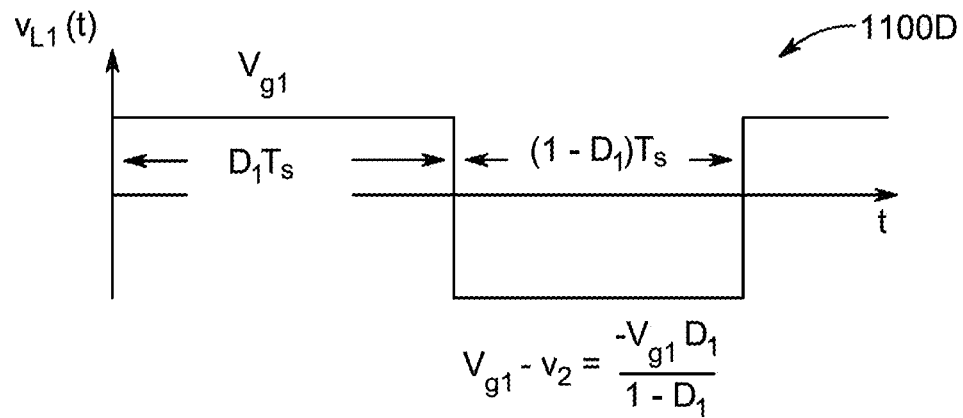
FIG. 11D illustrates a graphical representation architecture illustrating a voltage waveform of inductor $L_1$ of the dual-input isolated DC-DC converter, according to an embodiment of the present invention.

FIG. 11D illustrates a graphical representation 1100D illustrating a voltage waveform of inductor $L_1$ of the dual-input isolated DC-DC converter, according to an embodiment of the present invention.

Figure 11E:
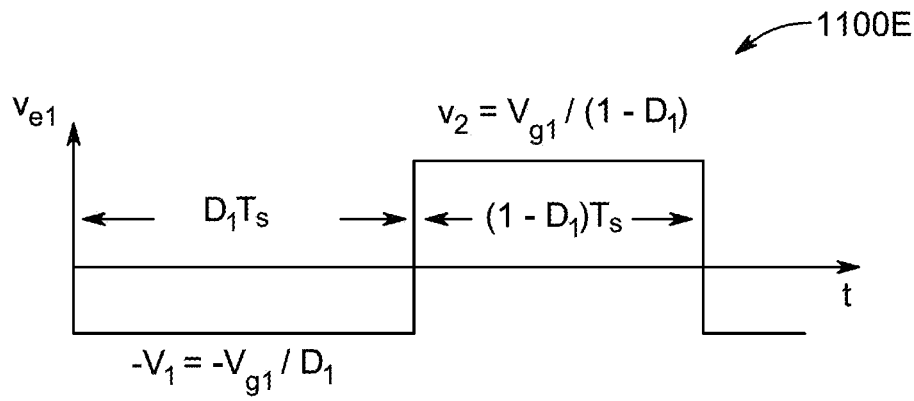
FIG. 11E illustrates a graphical representation architecture illustrating voltage waveform across the parallel combination of $L_M$ and $R_{e1}$ of the dual-input isolated DC-DC converter, according to an embodiment of the present invention.

FIG. 11E illustrates a graphical representation 1100E illustrating a voltage waveform of inductor $L_1$ of the dual-input isolated DC-DC converter, according to an embodiment of the present invention.

To validate the solution, the following equations are checked.

Power from PV sources=Power delivered to the load $$V_{g1\_MPPT} I_{1\_MPPT} + V_{g2\_MPPT} I_{2\_MPPT} = \frac{V_{e1}^2}{R_{e1}} + \frac{V_{e2}^2}{R_{e2}} = \frac{V_o^2}{R} \quad (A27)$$

Figure 10A:
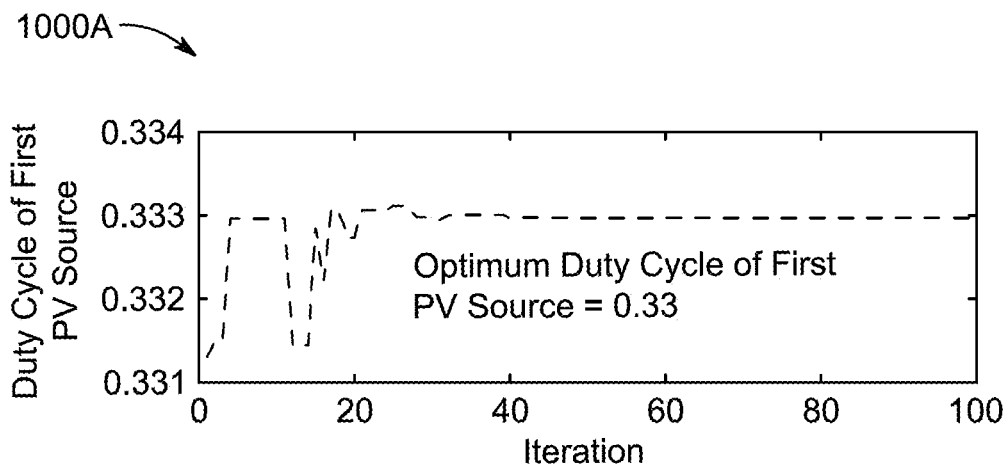
FIG. 10A illustrates a graphical representation showing an evolution of duty cycles for a PV panel controlled by a Particle Swarm Optimization (PSO) algorithm, according to an embodiment of the present invention.
Figure 10B:
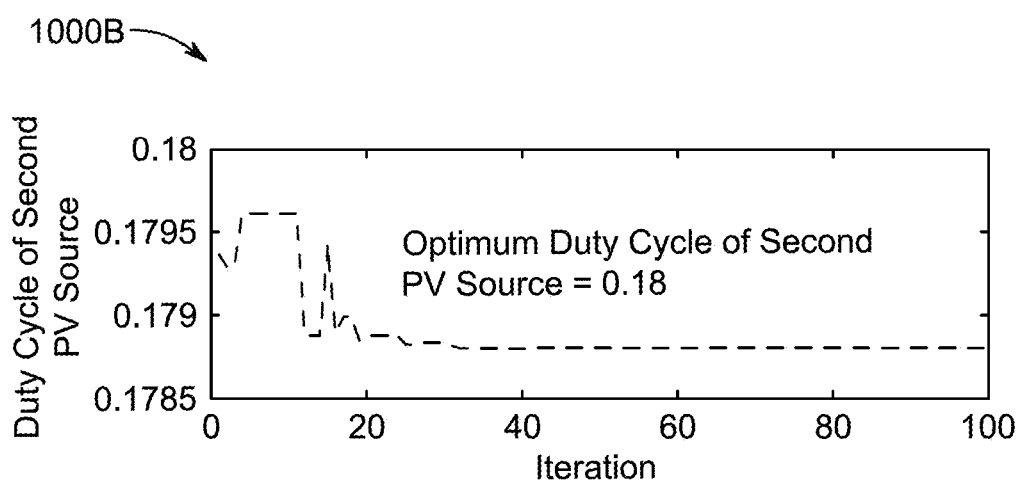
FIG. 10B illustrates a graphical representation showing the evolution of duty cycles for another PV panel controlled by the PSO algorithm, according to an embodiment of the present invention.

A graph showing the evolution of duty cycles for two PV panels controlled by a Particle Swarm Optimization (PSO) algorithm is illustrated in FIGS. 10A-10B. The iterative process optimizes the switching parameters for each PV panel 102, improving power extraction under varying irradiance conditions. The graphical representations 1000A, 1000B highlight the adaptive capability of the system to achieve optimal performance. The graphical representations 1000A, 1000B illustrate the dynamic behavior and eventual convergence of an optimization algorithm applied to two PV panels 102. Each graphical representation tracks the duty cycle of the PV panel against a total of 100 iterations, revealing how the system refines its operating parameters over time.

FIG. 10A illustrates the graphical representation 1000A disclosing the "Duty Cycle of First PV Source," with values ranging from approximately 0.331 to 0.334 on the Y-axis. In the initial iterations, specifically within the first 20 or so, the duty cycle exhibits notable fluctuations, indicating an exploratory phase of the optimization process. However, beyond this initial period, the curve stabilizes remarkably, converging towards a consistent value. The graphical representations explicitly state the "Optimum Duty Cycle of First PV Source=0.33," signifying the stable and ideal operating point achieved by the algorithm.

FIG. 10B illustrates the graphical representation 1000A disclosing the "Duty Cycle of Second PV Source," with its Y-axis spanning from about 0.1785 to 0.18. This plot also demonstrates an initial period of variability during the early iterations (up to around 20-25). As the iterations progress, the fluctuations diminish, and the duty cycle settles into a steady state. The graph identifies the "Optimum Duty Cycle of Second PV Source=0.18," confirming the successful identification of the optimal operating duty cycle for the second PV source. In summary, both graphical representations effectively showcase the convergence properties of the underlying optimization algorithm. Despite initial transient behavior, the PSO algorithm efficiently navigates the parameter space to identify and stabilize at optimal duty cycle values for both PV sources, demonstrating its effectiveness in achieving a desired operational state within a reasonable number of iterations.

Further, in the next step, identical PV panels or solar panels are characterized.

Figure 12:
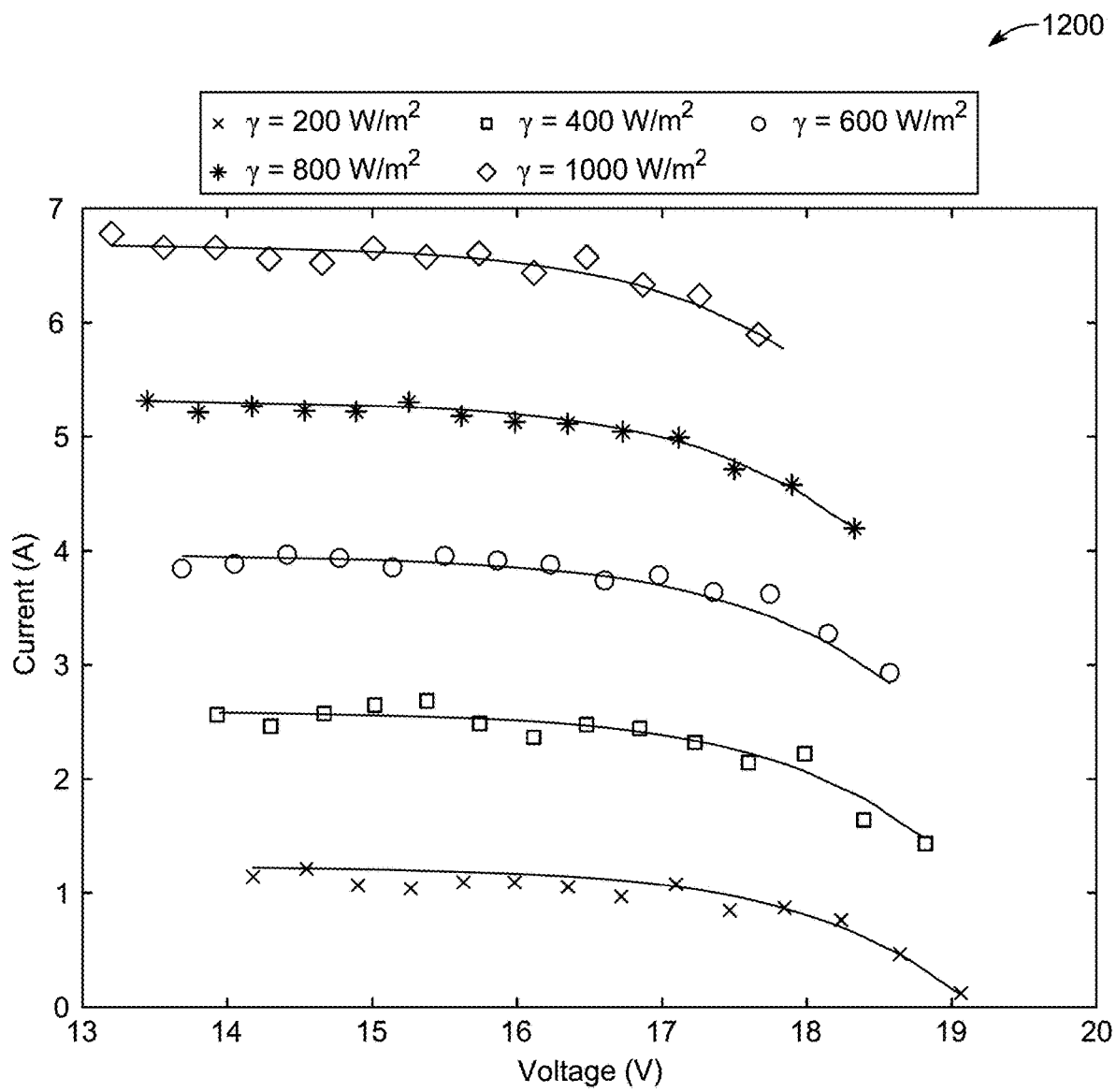
FIG. 12 illustrates a graphical representation of current-voltage (I-V) characteristics of the PV panel, highlighting variations across various solar irradiance levels, according to an embodiment of the present invention.

FIG. 12 illustrates a graphical representation 1200 of current-voltage (I-V) characteristics of the PV panel 102, highlighting variations across various solar irradiance levels, according to an embodiment of the present invention. FIG. 12 shows the characteristic curves of one of the PV panels 102.

The graphical representation displays the current-voltage (I-V) characteristics of the PV panel 102 used in the experiment, demonstrating how its performance changes under varying solar irradiance levels.

The X-axis represents "Voltage (V)," ranging from approximately 13 V to 20 V. The Y-axis represents "Current (A)," with values ranging from 0 to 7 A.

The FIG. 12 presents five distinct curves, each corresponding to a different level of solar irradiance, denoted by 'γ'. The solar irradiance levels are given in W/m².

γ=200 W/m² (represented by 'x' markers)
γ=400 W/m² (represented by square markers)
γ=600 W/m² (represented by circle markers)
γ=800 W/m² (represented by asterisk markers)
γ=1000 W/m² (represented by diamond markers)

For each irradiance level, the measured current-voltage values are plotted as discrete markers (circles, squares, 'x', asterisks, diamonds). The curves illustrate the typical I-V characteristic of the PV panel 102, where current remains relatively constant for a range of voltages before sharply decreasing as the voltage increases further, especially noticeable at higher irradiance levels. As expected, higher solar irradiance levels result in higher current outputs for a given voltage, indicating increased power generation.

Figure 13:
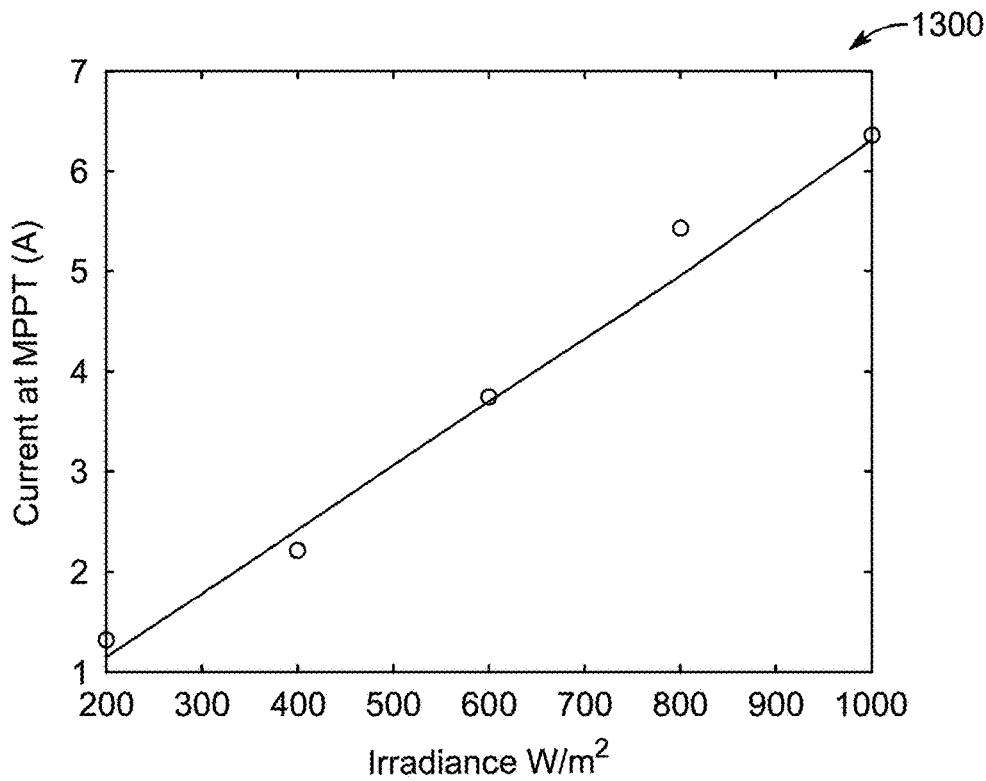
FIG. 13 illustrates a graphical representation of the current at Maximum Power Point (MPPT) of the I-V curve for the PV panel, demonstrating variations across different solar irradiance levels, according to an embodiment of the present invention.

FIG. 13 illustrates a graphical representation 1300 of the current at the maximum power point tracking (MPPT) of the I-V curve for the PV panel 102, demonstrating variations across different solar irradiance levels, according to an embodiment of the present invention.

The graphical representation 1300 depicts the relationship between solar irradiance and the current generated at the maximum power point tracking (MPPT) of the PV panel 102 used in the experiment.

The X-axis represents "Irradiance W/m²", with values ranging from 200 W/m² to 1000 W/m². The Y-axis represents "Current at MPPT (A)", ranging from 1 A to 7 A.

The plot shows individual measured values as circles, demonstrating the current at the MPPT for various solar irradiance levels. A solid orange line represents a linear curve fit through these measured data points. The graph visually indicates a strong positive correlation: as solar irradiance increases, the current generated at the MPPT also increases, following a generally linear trend.

Figure 14:
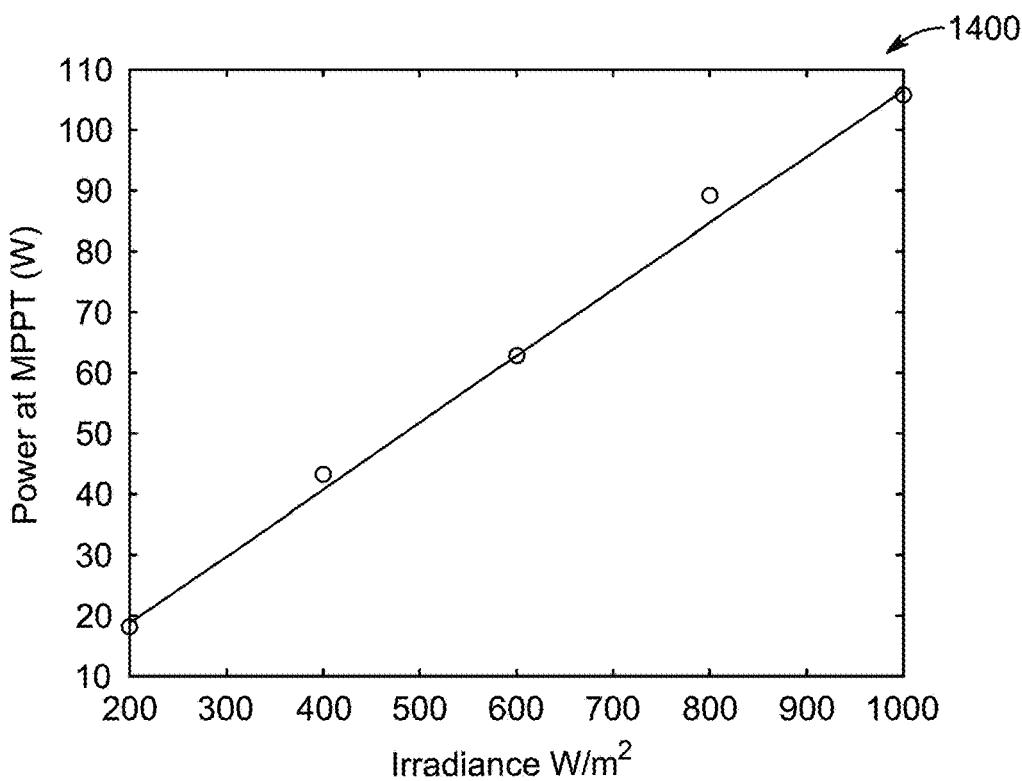
FIG. 14 illustrates a graphical representation of the MPPT of the I-V curve for the PV panel, according to an embodiment of the present invention.

FIG. 14 illustrates a graphical representation 1400 of the maximum power point tracking (MPPT) of the I-V curve for the PV panel, according to an embodiment of the present invention. FIG. 14 displays the power at the MPPT for different levels of sunlight intensity for the same PV panel 102.

The graphical representation 1400 illustrates the MPPT of the PV panel I-V curve, showcasing how power output varies with different solar irradiance levels in the experiment. The X-axis of the graph indicates "Irradiance W/m²", spanning from 200 W/m² to 1000 W/m². The Y-axis represents "Power at MPPT (W)", with values ranging from 10 W to 110 W.

As described, measured values for the power at the MPPT at various irradiance levels are depicted by circular markers. A solid line, representing a linear curve fit, is drawn through these data points. The graph clearly demonstrates a direct and generally linear relationship: as the solar irradiance increases, the power generated at the MPPT of the PV panel also increases. This trend confirms that the power output of the PV panel 102 is strongly dependent on the intensity of the incident solar radiation.

Figure 15:
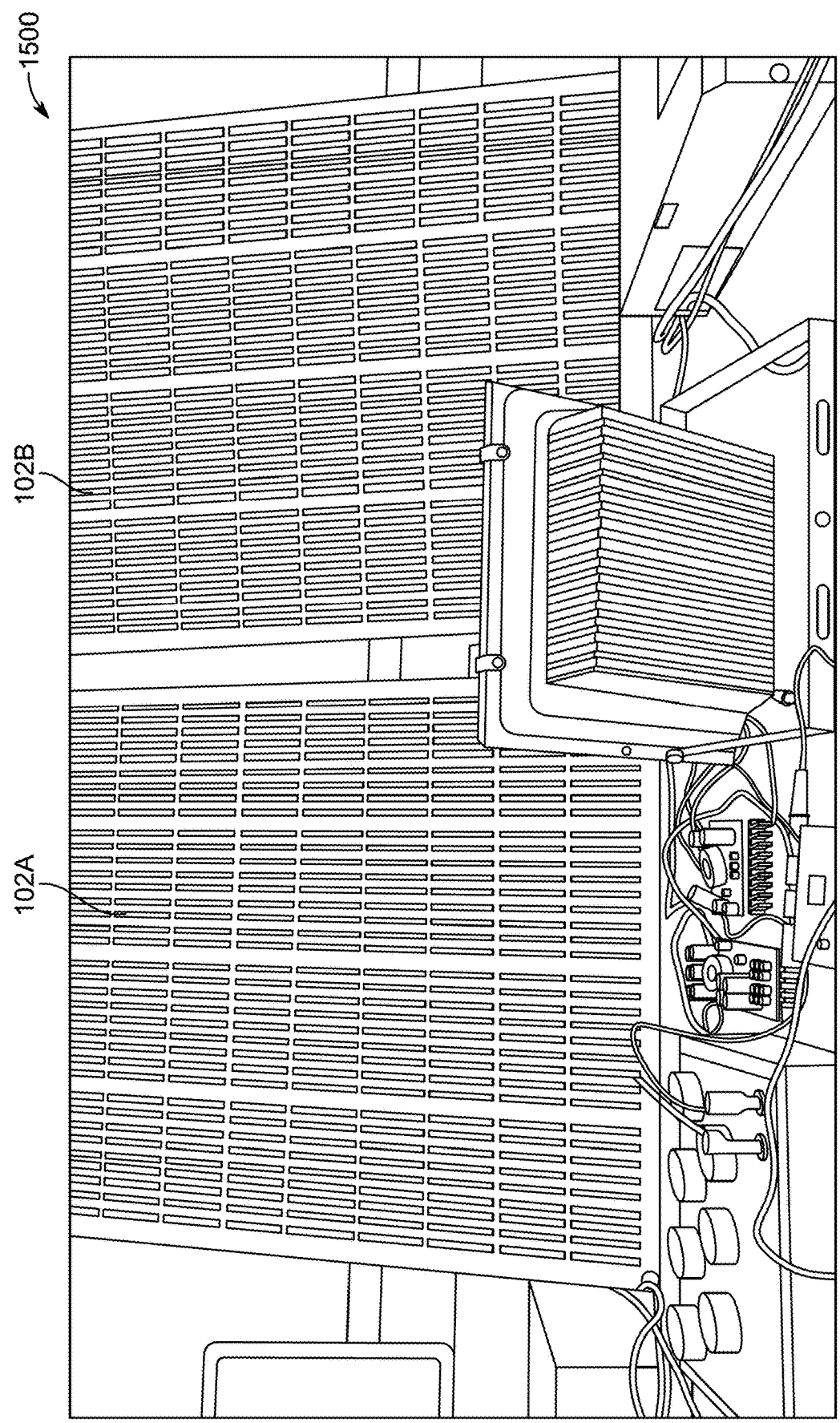
FIG. 15 illustrates an experimental setup for evaluating the dual-input DC-DC converter, according to an embodiment of the present invention.

FIG. 15 illustrates an experimental setup for evaluating the dual-input DC-DC converter 10, according to an embodiment of the present invention. The setup includes two PV panels 102A, 102B, an adjustable light source to simulate shading, a Raspberry Pi running the PSO algorithm, and the converter circuit. The experimental apparatus was designed to assess the performance of the dual-input DC-DC converter under variable shading conditions on individual solar panels. The configuration includes:

1. A pair of identical solar panels.
2. An adjustable light source to emulate variations in solar irradiance.
3. A Raspberry Pi programmed with the PSO algorithm to adjust the duty cycles of the converter's switches dynamically.
4. The dual-input DC-DC converter, as depicted in FIG. 8.
5. Current and voltage sensors, integrated with analog-to-digital converters (ADCs), to accurately capture the current and voltage levels from the PV panels 102A, 102B and relay these measurements to the Raspberry Pi module.

The experimental evaluation encompasses an analysis of the effect of irradiance levels incident on each PV panel. The system performance is tested in conjunction with an assessment of the control system's efficacy in modulating the duty cycles ($D_1$ and $D_2$) for each corresponding solar input to the converter. This modulation, coupled with the optimization of the phase difference (θ) between the switching waveforms, enhances the power extraction efficiency from the PV panels.

Figure 16:
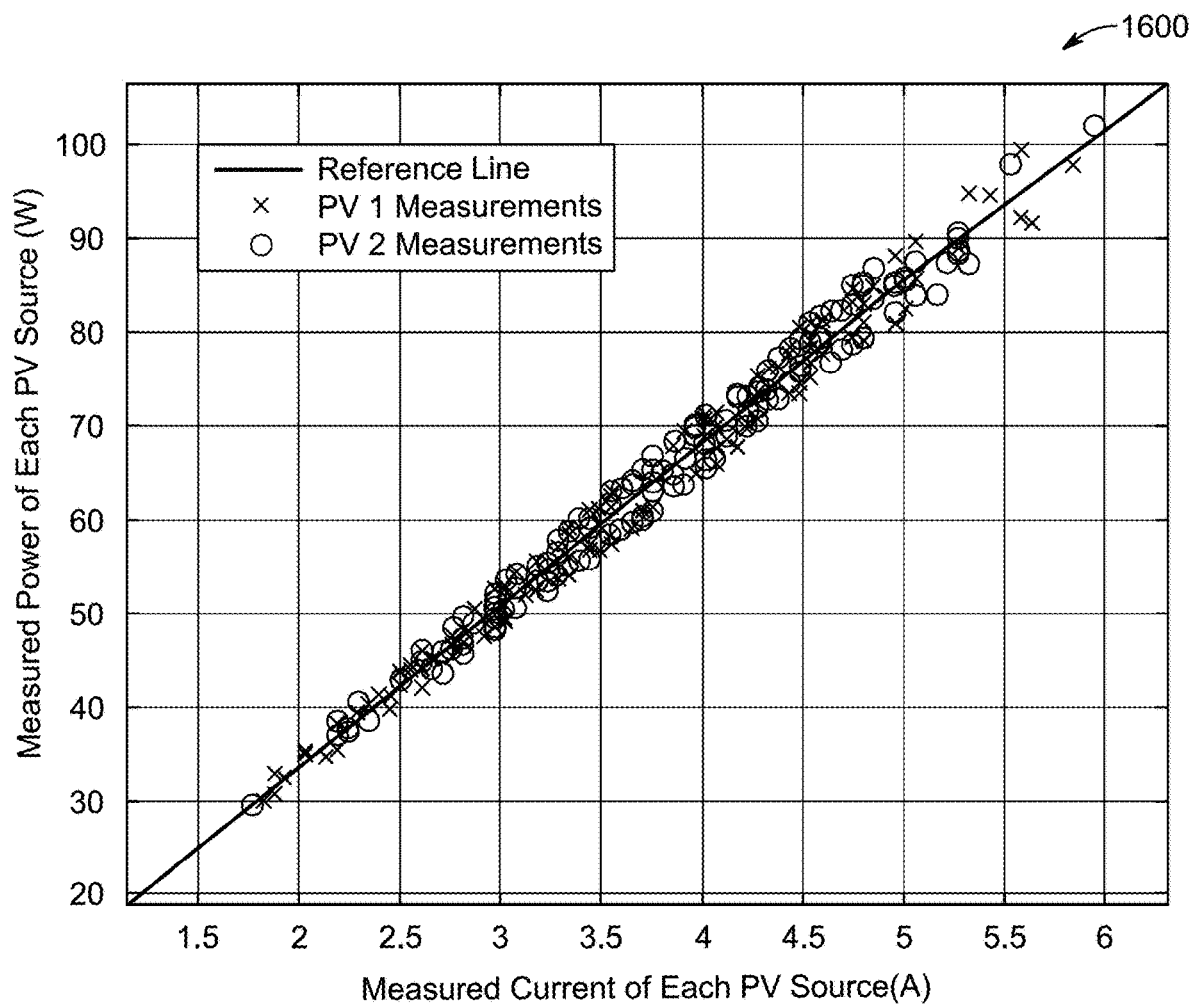
FIG. 16 illustrates a graphical representation of power and current measurements of PV sources under variable irradiance levels with the control algorithm, according to an embodiment of the present invention.

FIG. 16 illustrates a graphical representation 1600 of power and current measurements of the PV panels under variable irradiance levels with the control algorithm, according to an embodiment of the present invention. FIG. 16 illustrates the power and current measurements of each PV source subjected to the control algorithm under randomly varying light conditions, as demonstrated by the two distinct sets of data points. The measurements were taken at five-second intervals over a period of 15 minutes, simulating real-world environmental changes. The reference line represents the expected performance based on standardized PV panel tests and serves as a benchmark for evaluating the efficacy of the control algorithm. Noticeably, the data points indicate a robust response to the adjustments, with most measurements aligning closely with the reference, thus confirming the precision of the algorithm in tracking the maximum power point under fluctuating irradiance levels.

The timeframe of the experiment and corresponding light variations suggest that the control mechanism can reliably adapt to typical transient shifts in solar intensity, which is essential for maximizing energy harvest throughout the day.

The data demonstrates the system's ability to maintain performance close to standardized benchmarks, despite fluctuations in sunlight. The adaptive control ensures consistent power delivery to the load. The line is drawn as a reference which was obtained from PV panel test.

Next, further details of the hardware description of the computing environment of FIG. 1 according to exemplary embodiments are described with reference to FIG. 17.

The hardware elements in the computing device may be realized by various circuitry elements, known to those skilled in the art. For example, CPU 1701 or CPU 1703 may be a Xenon or Core processor from Intel of America or an Opteron processor from AMD of America, or may be other processor types that would be recognized by one of ordinary skill in the art. Alternatively, the CPU 1701, 1703 may be implemented on an FPGA, ASIC, PLD or using discrete logic circuits, as one of ordinary skilled in the art would recognize. Further, CPU 1701, 1703 may be implemented as multiple processors cooperatively working in parallel to perform the instructions of the inventive processes described above.

Figure 17:
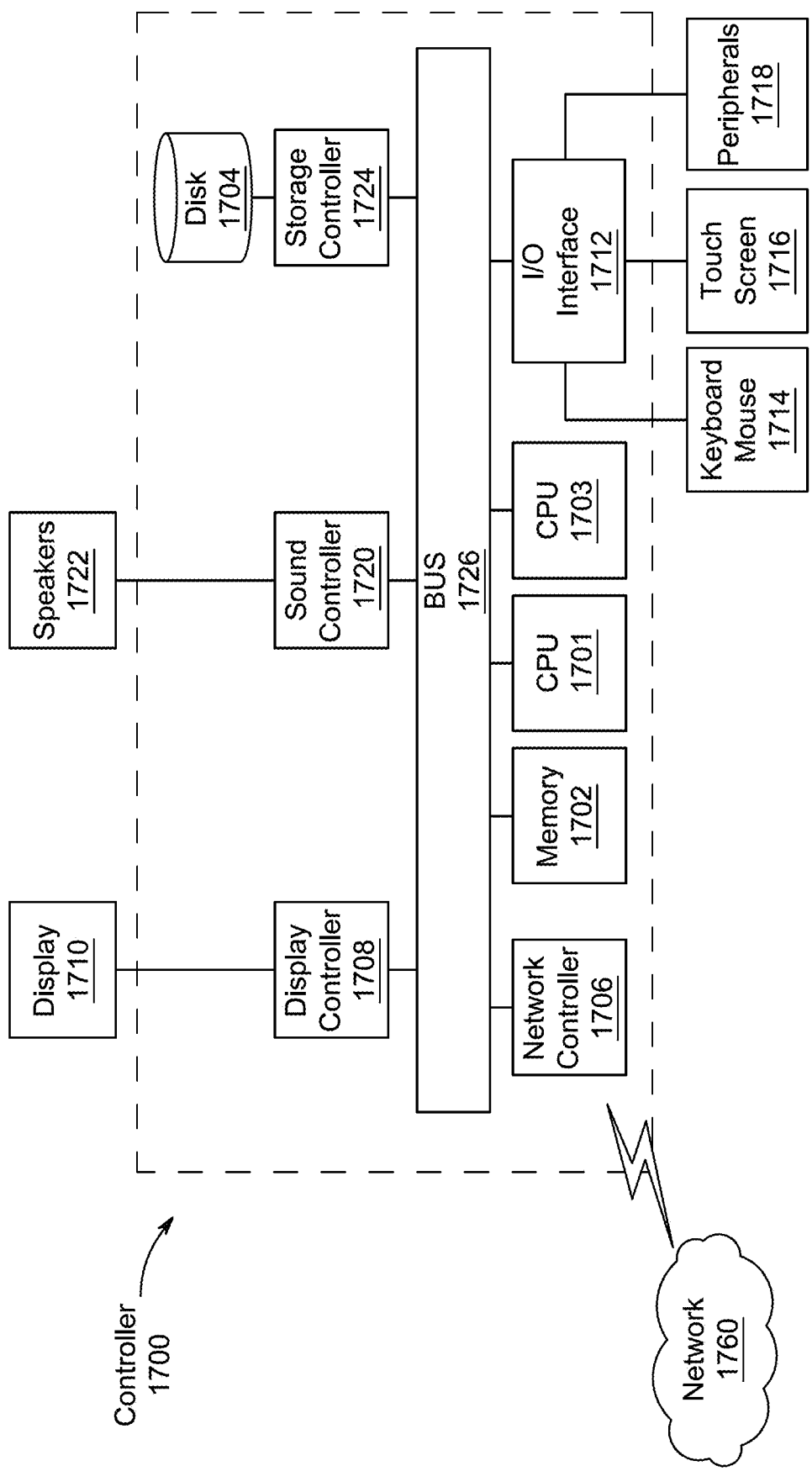
FIG. 17 is an illustration of a non-limiting example of details of computing hardware used in a computing system, according to an embodiment of the present invention.

The computing device in FIG. 17 also includes a network controller 1706, such as an Intel Ethernet PRO network interface card from Intel Corporation of America, for interfacing with network 1760. As can be appreciated, the network 1760 can be a public network, such as the Internet, or a private network such as an LAN or WAN network, or any combination thereof and can also include PSTN or ISDN sub-networks. The network 1760 can also be wired, such as an Ethernet network, or can be wireless, such as a cellular network including EDGE, 3G and 4G wireless cellular systems. The wireless network can also be WiFi, Bluetooth, or any other wireless form of communication that is known.

The computing device further includes a display controller 1708, such as a NVIDIA GeForce GTX or Quadro graphics adaptor from NVIDIA Corporation of America for interfacing with display 1710, such as a Hewlett Packard HPL2445w LCD monitor. A general purpose input-output (I/O) interface 1712 interfaces with a keyboard and/or mouse 1714 as well as a touch screen panel 1716 on or separate from display 1710. General purpose I/O interface also connects to a variety of peripherals 1718 including printers and scanners, such as an OfficeJet or DeskJet from Hewlett Packard.

A sound controller 1720 is also provided in the computing device such as Sound Blaster X-Fi Titanium from Creative, to interface with speakers/microphone 1722 thereby providing sounds and/or music.

The general-purpose storage controller 1724 connects the storage medium disk 1704 with communication bus 1726, which may be an ISA, EISA, VESA, PCI, or similar, for interconnecting the components of the computing device. A description of the general features and functionality of the display 1610, keyboard and/or mouse 1714, as well as the display controller 1708, storage controller 1724, network controller 1706, sound controller 1720, and general purpose I/O interface 1712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 18.

Figure 18:
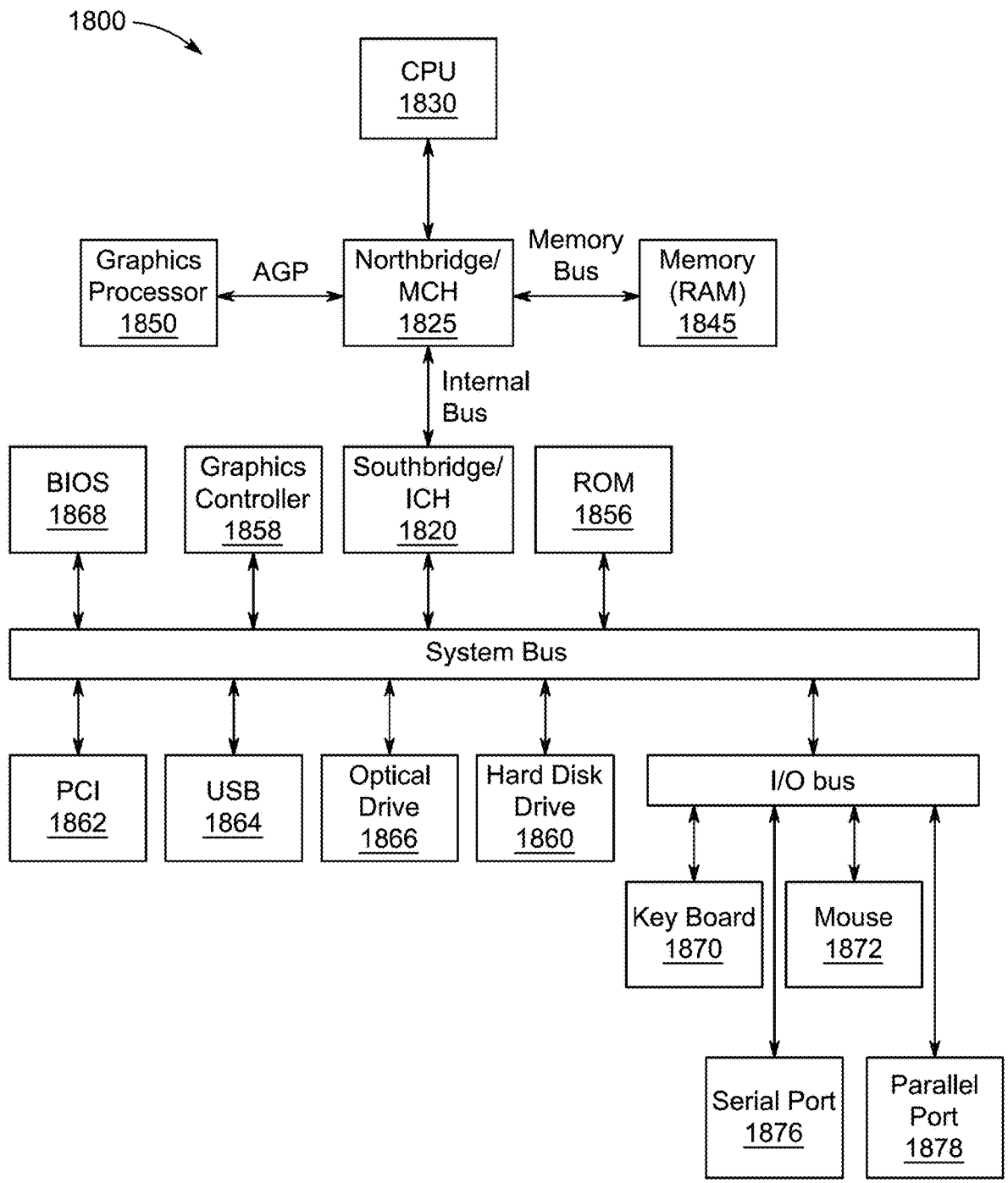
FIG. 18 is an exemplary schematic diagram of a data processing system used within the computing system, according to an embodiment of the present invention.

FIG. 18 shows a schematic diagram of a data processing system, according to certain embodiments, for performing the functions of the exemplary embodiments. The data processing system is an example of a computer in which code or instructions implementing the processes of the illustrative embodiments may be located.

In FIG. 18, data processing system 1800 employs a hub architecture including a north bridge and memory controller hub (NB/MCH) 1885 and a south bridge and input/output (I/O) controller hub (SB/ICH) 1880. The central processing unit (CPU) 1830 is connected to NB/MCH 1885. The NB/MCH 1885 also connects to the memory 1845 via a memory bus and connects to the graphics processor 1850 via an accelerated graphics port (AGP). The NB/MCH 1885 also connects to the SB/ICH 1880 via an internal bus (e.g., a unified media interface or a direct media interface). The central processing unit (CPU) 1830 may contain one or more processors and even may be implemented using one or more heterogeneous processor systems.

Figure 19:
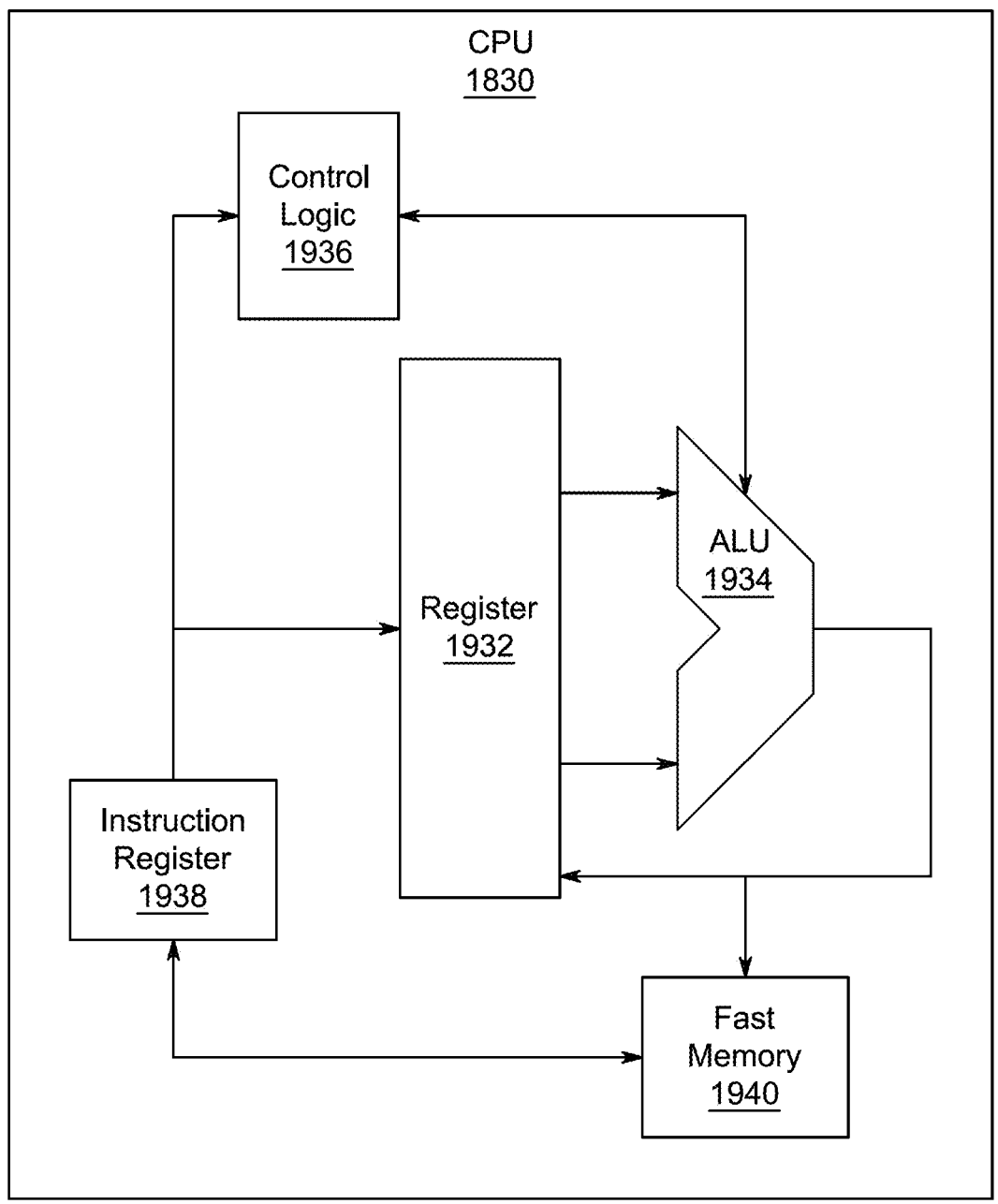
FIG. 19 is an exemplary schematic diagram of a processor used with the computing system, according to an embodiment of the present invention.

For example, FIG. 19 shows one implementation of CPU 1830. In one implementation, the instruction register 1982 retrieves instructions from the fast memory 1940. At least part of these instructions is fetched from the instruction register 1982 by the control logic 1986 and interpreted according to the instruction set architecture of the CPU 1930. In some cases, part of the instructions can also be directed to the register 1982. In one implementation, the instructions are decoded according to a hardwired method. In other implementations, the instructions are decoded according to a microprogram that translates instructions into sets of CPU configuration signals that are applied sequentially over multiple clock pulses. After fetching and decoding the instructions, the instructions are executed using the arithmetic logic unit (ALU) 1984 that loads values from the register 1982 and performs logical and mathematical operations on the loaded values according to the instructions. The results from these operations can be feedback into the register and/or stored in the fast memory 1940. According to certain implementations, the instruction set architecture of the CPU 1830 can use a reduced instruction set architecture, a complex instruction set architecture, a vector processor architecture, a very large instruction word architecture. Furthermore, the CPU 1830 can be based on the Von Neuman model or the Harvard model. The CPU 1830 can be a digital signal processor, an FPGA, an ASIC, a PLA, a PLD, or a CPLD. Further, the CPU 1830 can be an x56 processor by Intel or by AMD; an ARM processor, a Power architecture processor by, e.g., IBM; a SPARC architecture processor by Sun Microsystems or by Oracle; or other known CPU architecture.

Referring again to FIG. 18, the data processing system 1800 can include that the SB/ICH 1880 is coupled through a system bus to an I/O Bus, a read only memory (ROM) 1856, universal serial bus (USB) port 1864, a flash binary input/output system (BIOS) 1868, and a graphics controller 1858. PCI/PCIe devices can also be coupled to SB/ICH 1880 through a PCI bus 1862.

The PCI devices may include, for example, Ethernet adapters, add-in cards, and PC cards for notebook computers. The Hard disk drive 1860 and CD-ROM666 can use, for example, an integrated drive electronics (IDE) or serial advanced technology attachment (SATA) interface. In one implementation the I/O bus can include a super I/O (SIO) device.

Further, the hard disk drive (HDD) 1860 and optical drive 1866 can also be coupled to the SB/ICH 1880 through a system bus. In one implementation, a keyboard 1870, a mouse 1872, a parallel port 1878, and a serial port 1876 can be connected to the system bus through the I/O bus. Other peripherals and devices that can be connected to the SB/ICH 1880 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 20:
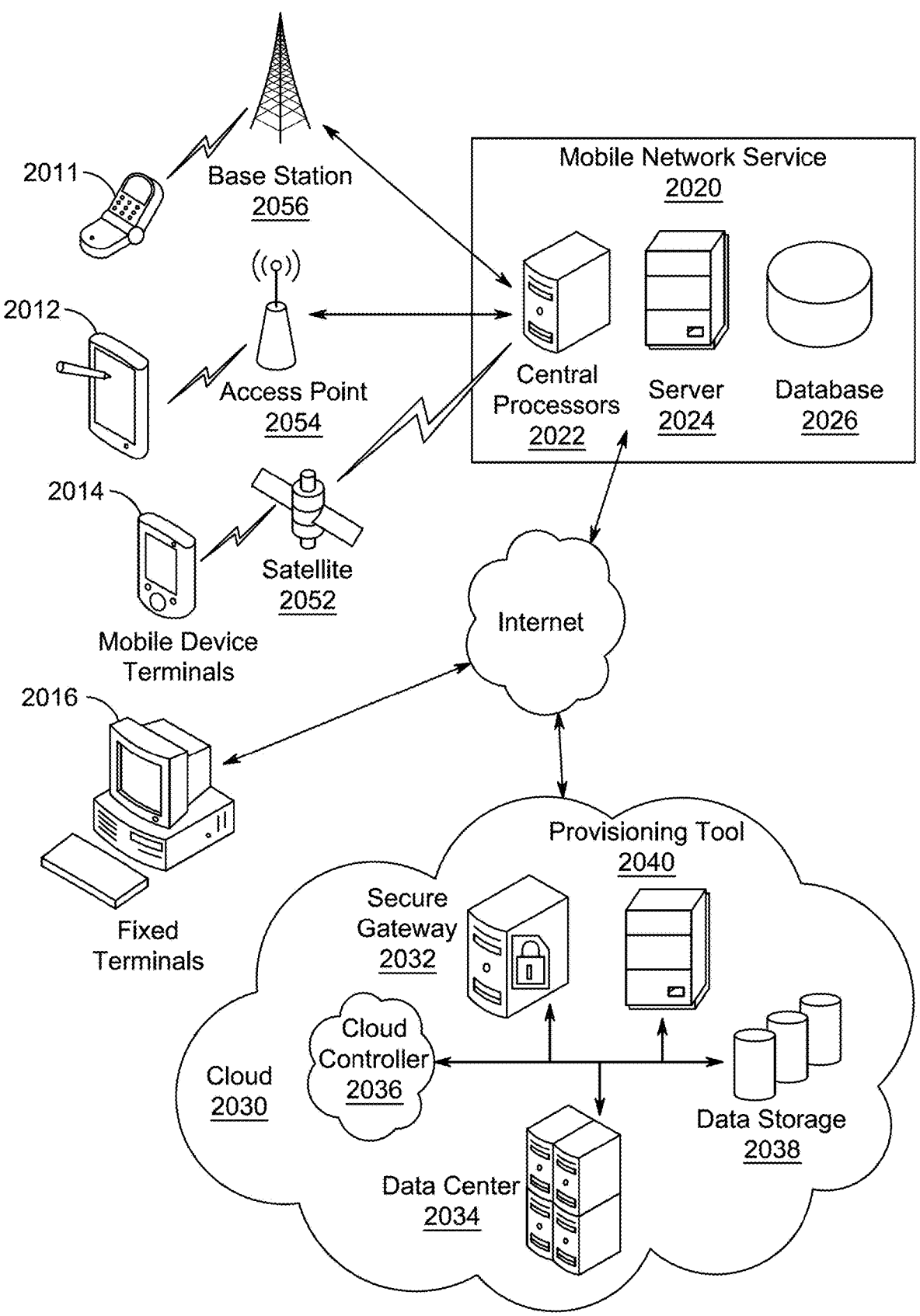
FIG. 20 is an illustration of a non-limiting example of distributed components which may share processing with a controller, according to an embodiment of the present invention.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 20, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely, either in real-time or as a batch process. Additionally, some aspects of the present disclosures may be performed on modules or hardware not identical to those described. Accordingly, other aspects of the present disclosures are within the scope that may be claimed. More specifically, FIG. 20 illustrates client devices including smart phone 2011, tablet 2012, mobile device terminal 2014 and fixed terminals 2016. These client devices may be commutatively coupled with a mobile network service 2020 via base station 2056, access point 2054, satellite 2052 or via an internet connection. Mobile network service 2020 may comprise central processors 2022, server 2024 and database 2026. Fixed terminals 2016 and mobile network service 2020 may be commutatively coupled via an internet connection to functions in cloud 2030 that may comprise security gateway 2032, data center 2034, cloud controller 2036, data storage 2038 and provisioning tool 2040.

The above-described hardware description is a non-limiting example of corresponding structure for performing the functionality described herein.

Those skilled in the art will recognize that numerous modifications, adaptations, and variations may be made to the embodiments described herein without departing from the spirit and scope of the present disclosure. It is therefore to be understood that within the scope of the appended claims, the invention may be practiced otherwise than as specifically described herein.

The invention claimed is:

1. A photovoltaic power system, comprising:
two or more photovoltaic (PV) panels;
a maximum power point tracking (MPPT) circuit configured to adjust power extraction from each PV panel;
a microcontroller configured to execute a real-time control algorithm to manage dynamic operation of the photovoltaic power system; and
a dual-input DC-DC converter configured to:
receive and process an independent power input from each PV panel;
maintain energy transfer to balance one or more variations in power due to mismatched irradiance conditions among the PV panels;
regulate a duty cycle based on a control signal from the microcontroller; and
produce an output voltage for one or more DC loads.

2. The system of claim 1, wherein the microcontroller is configured to:
measure and analyze a voltage, a current, and a power output from each PV panel;
detect one or more variations in irradiance and one or more mismatch effects between the PV panels;
execute a Particle Swarm Optimization (PSO) algorithm to determine one or more control parameters for the MPPT circuit and the dual-input DC-DC converter;
adjust the MPPT circuit and the dual-input DC-DC converter operation in response to a real-time condition; and
maintain power output during one or more shading conditions, one or more panel mismatch conditions, and one or more environmental variations.

3. The system of claim 1, wherein the MPPT circuit is configured to:
track the maximum power of each PV panel;
receive a control parameter from the microcontroller to adjust an operating condition of each PV panel; and
modify the voltage and current for each panel to increase energy extraction.

4. The system of claim 1, wherein the microcontroller is further configured to:
measure and analyze an irradiance level and an electrical characteristic of each PV panel;
detect and compensate for one or more differences in irradiance and power mismatch between the PV panels;
execute a Particle Swarm Optimization (PSO) algorithm to determine an operating parameter for each PV panel;
adjust an MPPT setting and a parameter of the dual-input DC-DC converter to increase power transfer; and
maintain a power output during one or more shading conditions and one or more environmental variations.

5. The system of claim 1, further comprising a switching matrix comprising three electronic switches for each PV panel, wherein the switching matrix is configured to:
reconfigure connections between the PV panels between series and parallel configurations; and
adjust the connections based on real-time irradiance data to meet a voltage requirement and a power requirement of an electrical load connected to an output of the dual-input DC-DC converter.

6. The system of claim 5, wherein the switching matrix is configured to bypass a PV panel to prevent a power loss in the system.

7. The system of claim 1, further comprising a photodetector array configured to measure real-time irradiance for each PV panel and provide the irradiance measurement to the microcontroller.

8. The system of claim 1, further comprising a battery storage system, wherein:
the dual-input DC-DC converter is configured to deliver the output voltage to charge the battery storage system; and
the microcontroller reconfigures connections of the PV panels to maintain power delivery to the battery storage system during one or more variations in irradiance.

9. The system of claim 1, wherein the dual-input DC-DC converter is configured to:
deliver the output voltage to a DC home appliance; and
the microcontroller is configured to control switching of connections of the PV panels to maintain the output voltage against one or more variations in irradiance.

10. The system of claim 1, wherein the dual-input DC-DC converter comprises a fixed-duty-cycle configuration that adapts the reconfigured connections of the PV panels to power a DC appliance using the output voltage and current.

11. The system of claim 1, wherein the dual-input DC-DC converter further comprises a transformer coupled to the PV panels through a plurality of switches, wherein:
each PV panel is connected to the transformer through a switch; and
the microcontroller adjusts a duty cycle for the switch to compensate for power variation at a corresponding PV panel due to an irradiance condition.

12. The system of claim 1, wherein the dual-input DC-DC converter is configured to operate with a fixed configuration; and
the microcontroller is configured to dynamically reconfigure the connections of the PV panels to adapt to one or more changes in irradiance conditions.

13. The system of claim 1, wherein the microcontroller is further configured to:
adjust a phase shift between a switching cycle of a switch connected to a PV panel and a switching cycle of another switch connected to another PV panel to improve power extraction from the PV panels.

14. The system of claim 2, wherein the Particle Swarm Optimization (PSO) algorithm is configured to:
explore a plurality of duty cycle combinations for each PV panel;
evaluate a fitness function based on power extraction; and
determine a duty cycle value that balances one or more power variations between the PV panels.

15. The system of claim 1, wherein the microcontroller executes an algorithm that:
analyzes a power requirement of a plurality of DC appliances connected to the system;
determines a switch configuration based on the analyzed power; and
distributes power to the plurality of DC appliances.

16. A method for reconfiguring connections between photovoltaic panels, comprising:
measuring a real-time irradiance level at each PV panel using a photodetector array;
analyzing the irradiance level to determine a panel connection configuration;
activating or deactivating a plurality of switches to connect the PV panels in a series arrangement or a parallel arrangement; and
adapting connections of the PV panels to maintain a voltage to an electrical load when an environmental condition changes.

* * * * *